United States Patent
Zhang et al.

(10) Patent No.: US 11,906,824 B2
(45) Date of Patent: Feb. 20, 2024

(54) OPTICAL MODULATOR USING MONOCRYSTALLINE AND POLYCRYSTALLINE SILICON

(71) Applicant: Cisco Technology, Inc., San Jose, CA (US)

(72) Inventors: Xunyuan Zhang, Mechanicsburg, PA (US); Vipulkumar K. Patel, Breinigsville, PA (US); Prakash B. Gothoskar, Allentown, PA (US); Ming Gai Stanley Lo, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/177,497

(22) Filed: Mar. 2, 2023

(65) Prior Publication Data

US 2023/0204987 A1 Jun. 29, 2023

Related U.S. Application Data

(62) Division of application No. 17/302,632, filed on May 7, 2021, now Pat. No. 11,619,838, which is a division of application No. 16/356,982, filed on Mar. 18, 2019, now Pat. No. 11,036,069.

(51) Int. Cl.
*G02F 1/025* (2006.01)

(52) U.S. Cl.
CPC ........ *G02F 1/025* (2013.01); *G02F 2202/104* (2013.01); *G02F 2202/105* (2013.01)

(58) Field of Classification Search
CPC ........ G02F 1/025; G02F 1/011; G02F 1/0152; G02F 1/2257; G02F 2202/104; G02F 2202/105; G02F 2001/0151; G02F 2001/0152; G02B 6/122; G02B 6/132; G02B 6/136; Y10S 977/834; H04B 10/54
See application file for complete search history.

(56) References Cited

U.S. PATENT DOCUMENTS 9,766,484 B2 * 9/2017 Adams ................ G02F 1/025
2021/0132420 A1 * 5/2021 Vert ................... H01L 21/2022

* cited by examiner

*Primary Examiner* — Michael P Mooney
(74) *Attorney, Agent, or Firm* — Patterson + Sheridan, LLP

(57) ABSTRACT

Embodiments provide for an optical modulator, comprising: a lower guide, comprising: a lower hub, made of monocrystalline silicon; and a lower ridge, made of monocrystalline silicon that extends in a first direction from the lower hub; an upper guide, including: an upper hub; and an upper ridge, made of monocrystalline silicon that extends in a second direction, opposite of the first direction, from the upper hub and is aligned with the lower ridge; and a gate oxide layer separating the lower ridge from the upper ridge and defining a waveguide region with the lower guide and the upper guide.

8 Claims, 21 Drawing Sheets

OPTICAL MODULATOR USING MONOCRYSTALLINE AND POLYCRYSTALLINE SILICON

CROSS-REFERENCE TO RELATED APPLICATIONS

This application is a divisional of co-pending U.S. patent application Ser. No. 17/302,632 filed May 7, 2021, which is a divisional of Ser. No. 16/356,982, filed Mar. 18, 2019, which issued on Jun. 15, 2021 as U.S. Pat. No. 11,036,069. The aforementioned related patent application is herein incorporated by reference in its entirety

TECHNICAL FIELD

Embodiments presented in this disclosure generally relate to Silicon-Insulator-Silicon Capacitors (SISCAPs). More specifically, embodiments disclosed herein provide for improvements to SISCAPs and the fabrication thereof via capacitive junctions including monocrystalline silicon.

BACKGROUND

The performance characteristics, such as signal bandwidth, of optical modulators may be negatively affected by parasitic or access resistances in polycrystalline regions, which is a function of the doping level and mobility of free carriers therein. Higher levels of doping, however, may negatively affect optical signal losses, and the mobility of the free carrier may be bounded by grain boundaries within the polycrystalline region and interfaces between the polycrystalline region and other regions of the optical modulator.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
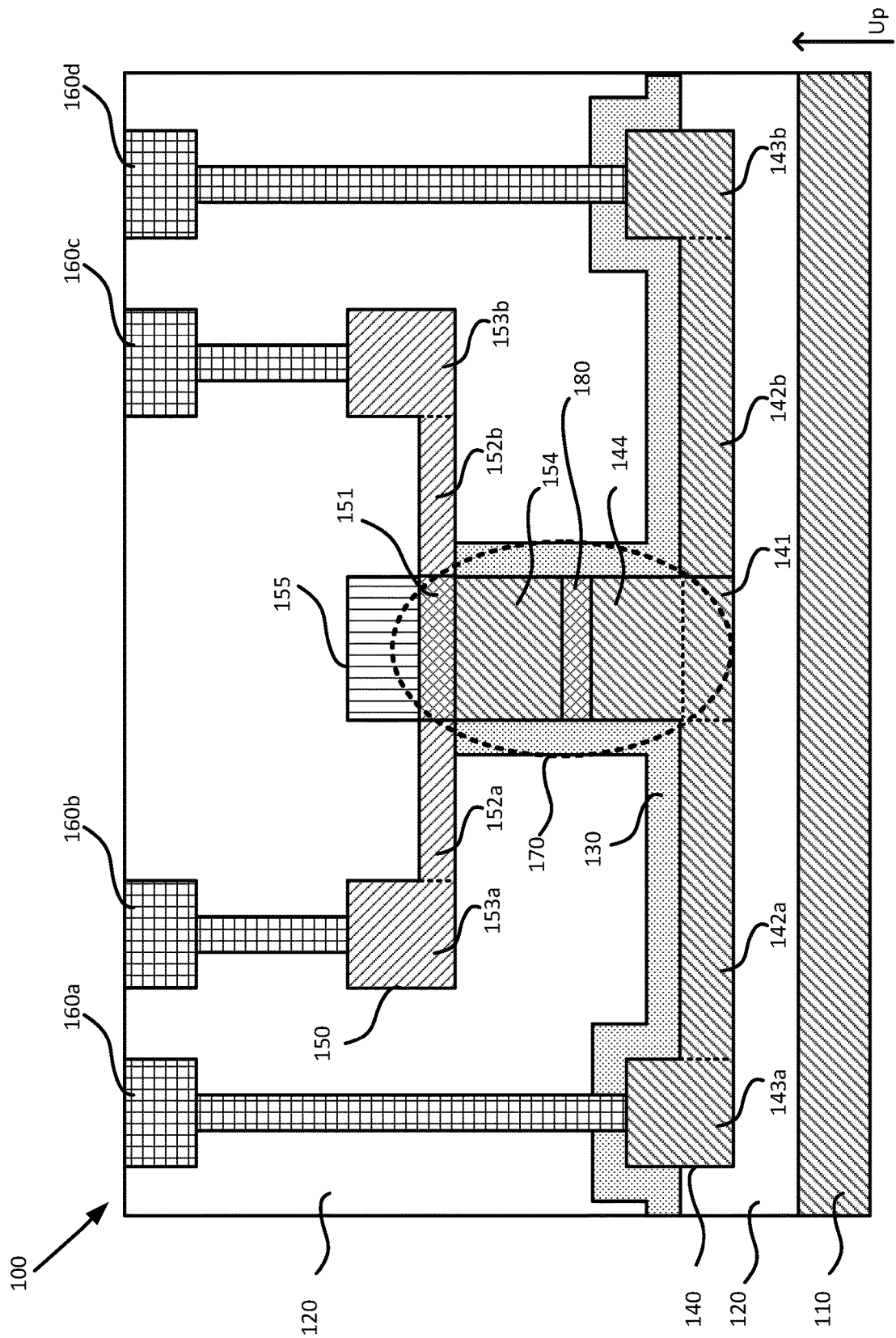
FIG. 1 illustrates an optical modulator, according to embodiments of the present disclosure.

One embodiment presented in this disclosure provides an optical modulator, comprising: a lower guide, comprising: a lower hub, made of monocrystalline silicon; and a lower ridge, made of monocrystalline silicon that extends in a first direction from the lower hub; an upper guide, including: an upper hub; and an upper ridge, made of monocrystalline silicon that extends in a second direction, opposite of the first direction, from the upper hub and is aligned with the lower ridge; and a gate oxide layer separating the lower ridge from the upper ridge and defining a waveguide region with the lower guide and the upper guide.

One embodiment presented in this disclosure provided a method of forming an optical modulator, comprising: patterning a base component to impart: a lower waveguide that is separated from a substrate of the base component by a first layer of an insulator; an upper ridge for an upper waveguide that is located above the lower waveguide and is separated from the lower waveguide by a predefined height; depositing a gate oxide layer on the lower waveguide; depositing a second layer of the insulator on the gate oxide layer; etching the second layer of the insulator to define a cavity of a predefined shape; and forming polycrystalline silicon wings for the upper waveguide in the cavity.

One embodiment presented in this disclosure provides an optical modulator, comprising: a lower waveguide, made of monocrystalline silicon doped to exhibit a first conductivity type, including: a lower hub; a first lower wing that extends in a first direction from the lower hub; a second lower wing that extends in a second direction from the lower hub; and a lower ridge that extends upward from the lower hub, wherein the lower ridge is doped less than the first lower wing and the second lower wing; a gate oxide layer deposited on an upper surface of the lower waveguide; an upper waveguide, doped to exhibit a second conductivity type that is different from the first conductivity type, including: an upper ridge, made of monocrystalline silicon, that is aligned with the lower ridge on a first axis and extends upward from the gate oxide layer to form a waveguide region with the lower ridge and the gate oxide layer; a first upper wing, made of polycrystalline silicon that is doped greater than the upper ridge, that extends in the first direction perpendicularly from the upper ridge; and a second upper wing, made of polycrystalline silicon that is doped greater than the upper ridge, that extends in the second direction perpendicularly from the upper ridge.

Example Embodiments

The present disclosure provides optical modulators, and methods of fabrication thereof, with improved operational characteristics. An optical modulator as described herein includes an upper and a lower waveguide, which together provide a capacitive junction (i.e., one P and one N junction). When an electrical field is applied to the waveguides, the waveguides are biased to affect (e.g., modulate) an optical signal passing through the waveguides. Although the various features and sub-components of the waveguides may be made of various materials (that may be doped at different concentrations) to provide the capacitive junction, by using monocrystalline silicon in both the P and N junctions of an optical modulator (rather than using polycrystalline silicon in one of the junctions), the bandwidth, loss performance, and light confinement of the modulator may be improved.

FIG. 1 illustrates an optical modulator 100, presenting several components and features referenced in various embodiments. The optical modulator 100 includes: a substrate 110, such as a silicon wafer, from which the other components are grown or formed; one or more layers of an insulator 120, such as $SiO_2$, that electrically isolates the other components; a layer of gate oxide 130 that forms a dielectric between a lower guide 140 and an upper guide 150, such as $SiO_2$ or $HfO_2$; a lower guide 140 and an upper guide 150 that form a waveguide region 170; and a plurality of contacts 160a-d (generally, contact 160) that allow for external electrical connections to be selectively established through the insulator 120 with the lower guide 140 and the upper guide 150. In various aspects, as an intermediate component during fabrication of the optical modulator 100, a temporary epitaxial layer 180, such as a SiGe layer, is present between the lower guide 140 and the upper guide 150, but may be replaced with the gate oxide 130 during fabrication.

For purposes of discussion, terms such as "up" or "above" shall relate to features further from the substrate 110, and terms such as "under" or "below" shall refer to features closer to the substrate 110. Accordingly, terms related to directions such as "upward" or "downward" shall be understood in relation to a feature extending away from or towards the substrate 110. Terms related to height (e.g., taller, shorter) shall refer to the dimension of a feature in the up/down axis, and terms related to width (e.g., longer, shorter) shall refer to the dimension of a feature in axis perpendicular to the up/down axis. For example, as illustrated in FIG. 1, the lower guide 140 shall be understood to be located above the substrate 110 and below the upper guide 150 regardless of the relative orientation of the optical modulator 100. Similarly, the lower guide 140 illustrated in FIG. 1 is longer than the upper guide 150, the lower ridge 144 extends upward and the upper ridge 154 extends downward, regardless of the relative orientation of the optical modulator 100.

The lower guide 140 is fabricated at a first distance above the substrate 110, and is separated from the upper guide 150 by either a temporary epitaxial layer 180 during fabrication, or a portion of the gate oxide 130 when fabrication is complete. The lower guide 140 is divided into several regions for purposes of explanation, and although FIG. 1 distinguishes these regions from one another via dashed lines, these regions are continuous within the lower guide 150 and are defined by relative heights and/or concentrations of dopants applied thereto. A lower hub 141 is defined in a central position of the lower guide 140 with two lower wings 142a,b (generally, lower wing 142) extending outward from the lower hub 141 in opposing directions. In some embodiments, the lower wings 142a,b terminate on a distal end from the lower hub 141 in respective lower interfaces 143a,b (generally, lower interfaces 143) that upward from the lower wings 142a,b. A lower ridge 144 extends upward from the lower hub 141.

In one embodiment, the lower guide 140 is fabricated from a Silicon semiconductor material that may be doped with various dopants to affect the optical and electrical properties of the lower guide 140, and the level of doping may vary in the various regions. For example, the lower wings 142 are doped with a higher concentration of the dopant(s) used in the lower guide 140 than the lower ridge 144 is doped with.

The upper guide 150 is fabricated at a second distance above the substrate 110, and is separated from the lower guide 140 by either a temporary epitaxial layer 180 during fabrication, or a portion of the gate oxide 130 when fabrication is complete. The upper guide 150 is divided into several regions for purposes of explanation, and although FIG. 1 distinguishes these regions from one another via dashed lines, these regions may be continuous within the upper guide 150. An upper hub 151 is defined in a central position of the upper guide 150 with two upper wings 152a,b (generally, upper wing 152) extending outward from the upper hub 151 in opposing directions. In some embodiments, the upper wings 152a,b terminate on a distal end from the upper hub 151 in respective upper interfaces 153a,b (generally, upper interfaces 153) that extend upward from the upper wings 152a,b. An upper ridge 154 extends downward from the upper hub 151, and in some embodiments, a cap 155 extends upward from the upper hub 151.

The upper guide 150 is fabricated from various materials in different regions. In some embodiments, the upper hub 151 and the upper ridge 154 are fabricated from monocrystalline silicon (Mono-Si), while the upper wings 152 (and any upper interfaces 153) are fabricated from polycrystalline silicon (Poly-Si). In some embodiments, the upper ridge 154 is fabricated from Mono-Si, while the upper hub 151, the upper wings 152 (and any upper interfaces 153) are fabricated from Poly-Si. In some embodiments, the upper ridge 154 is fabricated from Mono-Si and the upper hub 151 is fabricated from a single silicon crystal grown from the upper ridge 154, while the upper wings 152 (and any upper interfaces 153) are fabricated from Poly-Si.

The different regions of the upper guide 150 may be doped with various dopants to affect the optical and electrical properties of the upper guide 150, and the level of doping may vary in the various regions. In one example, the upper wings 152 are doped with a higher concentration of the dopant(s) used in the upper guide 150 than the upper ridge 154 is doped with. The upper guide 150 is doped to exhibit an opposite electrical conductivity type than the lower guide 140. In some embodiments, the upper guide 150 is P-doped and the lower guide 140 in N-doped, while in other embodiments, the upper guide 150 is N-doped and the lower guide 140 in P-doped.

The optional cap 155 of the upper guide 150 may be doped or undoped. In various embodiments, the cap 155 is provided as a passive, planar waveguide, or as a restive mask to chemical etching processes applied to the upper guide 150. In some embodiments, the cap 155 is made from SiN.

The gate oxide 130 separates the lower guide 140 from the upper guide 150 between the respective lower ridge 144 and upper ridge 154. The gate oxide 130 may be a thin layer of the insulator 120 or a different material that forms the dielectric of the optical modulator 100. Although FIG. 1 distinguishes the gate oxide 130 from the insulator 120, the gate oxide 130 may be contiguous with the insulator 120, and be defined by the dopants/materials applied thereto or the relative positions of the lower ridge 144 and upper ridge 154. The lower hub 141, lower ridge 144, gate oxide 130, upper ridge 154, and upper hub 151 collectively form a waveguide region 170 for an active waveguide (directing light into or out of the page relative to the view illustrated in FIG. 1). The gate oxide 130 provides for the efficient transport of carriers into and out of the lower guide 140 and the upper guide 150 when power is applied across the contacts of the optical modulator 100 to bias the optical modulator 100 and affect/modulate optical signals applied thereto. By including an upper ridge 154 made of a Mono-Si material like the lower ridge 144 in the waveguide region 170, improvements to the bandwidth and loss performance characteristics of the optical modulator 100 in comparison to similar constructions that use junctions that include poly-Si.

The contacts 160 are metallizations on a surface of the optical modulator 100 that allow for external devices to be electrically connected to various layers of the optical modulator 100 through vertical electrical connectors, such as the illustrated vias. Although illustrated in FIG. 1 on an upper surface of the optical modulator 100, in other embodiments, one or more contacts 160 may be located on different surfaces of the optical modulator 100, such as an underside of the substrate 110. Additionally, although illustrated as direct traces from the contacts 160 to the various interfaces of the guides, in various embodiments, a via may be a Through Silicon Via (TSV) that runs from a contact 160 on one surface to a corresponding contact 160 on an opposite surface of the optical modulator 100, to allow multiple contact points for external electrical devices to connect to the region that the via runs through.

Figure 2:
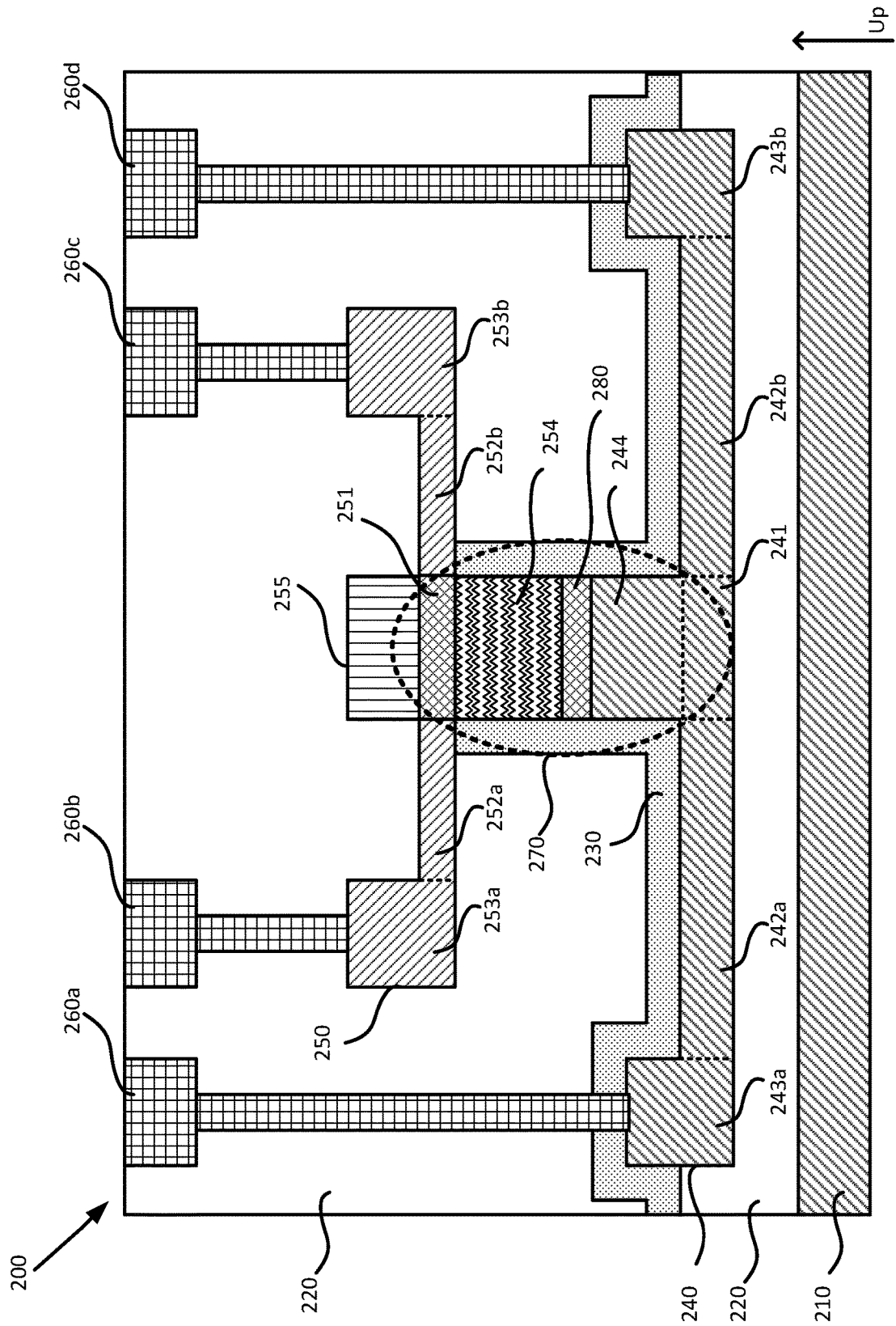
FIG. 2 illustrates an optical source, according to embodiments of the present disclosure.

FIG. 2 illustrates an optical source 200, presenting several components and features referenced in various embodiments. The optical source 200 includes: a substrate 210, such as a silicon wafer, from which the other components are grown or formed; one or more layers of an insulator 220, such as $SiO_2$, that electrically isolates the other components; a gate oxide 230; a lower guide 240 and an upper guide 250 that form a waveguide region 270; and a plurality of contacts 260a-d (generally, contact 260) that allow for external electrical connections to be selectively established through the insulator 220 with the lower guide 240 and the upper guide 250. In various aspects, as an intermediate component during fabrication of the optical source 200, a temporary epitaxial layer 280, such as a SiGe layer, is present between the lower guide 240 and the upper guide 250, but may be replaced with the gate oxide 230 during fabrication in some embodiments.

The dimensions of the components of the optical source 200 are shared with the components of the optical modulator 100, and directional/dimensional terms applied to the components are to be understood in the same orientation.

The lower guide 240 is fabricated at a first distance above the substrate 210, and is dimensioned according to the lower guide 140 of the optical modulator 100. The lower guide 240 is divided into several regions for purposes of explanation, and although FIG. 2 distinguishes these regions from one another via dashed lines, these regions are continuous within the lower guide 250 and are defined by relative heights and/or concentrations of dopants applied thereto. A lower hub 241 is defined in a central position of the lower guide 240 with two lower wings 242a,b (generally, lower wing 242) extending outward from the lower hub 241 in opposing directions. In some embodiments, the lower wings 242a,b terminate on a distal end from the lower hub 241 in respective lower interfaces 243a,b (generally, lower interfaces 243) that upward from the lower wings 242a,b. A lower ridge 244 extends upward from the lower hub 241.

In one embodiment, the lower guide 240 is fabricated from a monocrystalline silicon semiconductor material that may be doped with various dopants to affect the optical and electrical properties of the lower guide 240, and the level of doping may vary in the various regions. For example, the lower wings 242 are doped with a higher concentration of the dopant(s) used in the lower guide 240 than the lower ridge 244 is doped with.

The upper guide 250 is fabricated at a second distance above the substrate 210, and is dimensioned according to the upper guide 150 of the optical modulator 100. The upper guide 250 is divided into several regions for purposes of explanation, and although FIG. 2 distinguishes these regions from one another via dashed lines, these regions may be continuous within the upper guide 250. An upper hub 251 is defined in a central position of the upper guide 250 with two upper wings 252a,b (generally, upper wing 252) extending outward from the upper hub 251 in opposing directions. In some embodiments, the upper wings 252a,b terminate on a distal end from the upper hub 251 in respective upper interfaces 253a,b (generally, upper interfaces 253) that extend upward from the upper wings 252a,b. An active region 254 extends downward from the upper hub 251, and is dimensioned to match with the upper ridge 154 of the optical modulator 100. In some embodiments, a cap 255 extends upward from the upper hub 251.

The upper guide 250 is fabricated from various materials in different regions. In some embodiments, the upper hub 251 is fabricated from Mono-Si, while the upper wings 252 (and any upper interfaces 253) are fabricated from Poly-Si. In some embodiments, the upper hub 251 and the upper wings 252 (and any upper interfaces 253) are fabricated from Poly-Si. In some embodiments, the upper hub 251 is fabricated from a single Si crystal grown from the active region 254, while the upper wings 252 (and any upper interfaces 253) are fabricated from Poly-Si.

The active region 254 may include quantum dots, quantum wells or quantum wires, and bulk material. In some embodiments, the active region 254 provides lasing or optical amplification when current is applied across the active region 254. In some embodiments, the active region 254 provides optical detection by producing a voltage difference when an external light source is applied to the active region 254. The active region 254 may include various layers of different materials that are formed to surround the active region 254 and provide a waveguide to amplify and direct light produced by the active region 254. In some embodiments, a fabricator uses a III-V material in the cladding layers that is different than the III-V materials used in the active region 254 or that includes different dopants. The III-V materials used in the various layers may include, but is not limited to: GaAs, GaN, GaSb, InSb, InAs, InP, etc.

Quantum dots and quantum wells are nano-structures that exhibit various properties, such as light generation in the presence of an applied electrical current, based on quantum mechanical effects. Quantum wells are two-dimensional structures formed by a thin layer of a first material surrounded by wider-bandgap material and that allow electronic capture in one dimension (allowing planar two-dimensional movement). In contrast, quantum dots act as zero-dimensional entities which enables three-dimensional capture of excited electrons (not allowing movement). The quantum dots are surrounded by the waveguides of the cladding layers and are made of materials that have narrower bandgaps than the material of the cladding layers. As will be appreciated, the precise size, shape, and material of the quantum dots or wells affect the color of coherent light produced by the laser.

The different regions of the upper guide 250 may be doped with various dopants to affect the optical and electrical properties of the upper guide 250, and the level of doping may vary in the various regions. In one example, the upper wings 252 are doped with a higher concentration of the dopant(s) used in the upper guide 250 than the upper hub 251 is doped with. The upper guide 250 is doped to exhibit an opposite electrical conductivity type than the lower guide 240. In some embodiments, the upper guide 250 is P-doped and the lower guide 240 in N-doped, while in other embodiments, the upper guide 250 is N-doped and the lower guide 240 in P-doped. The upper guides 250 of the optical source 200 and the upper guides 150 of the optical modulator 100 are doped to exhibit the same electrical conductivity type (e.g., P-P or N-N), and the lower guides 240 of the optical source 200 and the lower guides 140 of the optical modulator 100 are doped to exhibit the same electrical conductivity type (e.g., N-N or P-P).

In some embodiments, the temporary epitaxial layer 280 separates the lower guide 240 from the upper guide 250 between the respective lower ridge 244 and active region 254. In some embodiments, the gate oxide 230 separates the lower guide 240 from the upper guide 250 between the respective lower ridge 244 and active region 254. The gate oxide 230 may be a thin layer of the insulator 220 or a different material that forms the dielectric of the optical modulator 100. Although FIG. 2 distinguishes the gate oxide 230 from the insulator 220, the gate oxide region 230 may be contiguous with the insulator 220, and be defined by the dopants/materials applied thereto or the relative positions of the lower ridge 244 and active region 254. The lower hub 241, lower ridge 244, gate oxide 230, active region 254, and upper hub 251 collectively form a waveguide region 270 for an active waveguide (directing light into or out of the page relative to the view illustrated in FIG. 2).

The contacts 260 are metallizations on a surface of the optical source 200 that allow for external devices to be electrically connected to various layers of the optical source 200 through vertical electrical connectors, such as the illustrated vias. Although illustrated in FIG. 2 on an upper surface of the optical source 200, in other embodiments, one or more contacts 260 may be located on different surfaces of the optical source 200, such as an underside of the substrate 210. Additionally, although illustrated as direct traces from the contacts 260 to the various interfaces of the guides, in various embodiments, a via may be a TSV that runs from a contact 260 on one surface to a corresponding contact 260 on an opposite surface of the optical source 200, to allow multiple contact points for external electrical devices to connect to the region that the via runs through.

Figure 3:
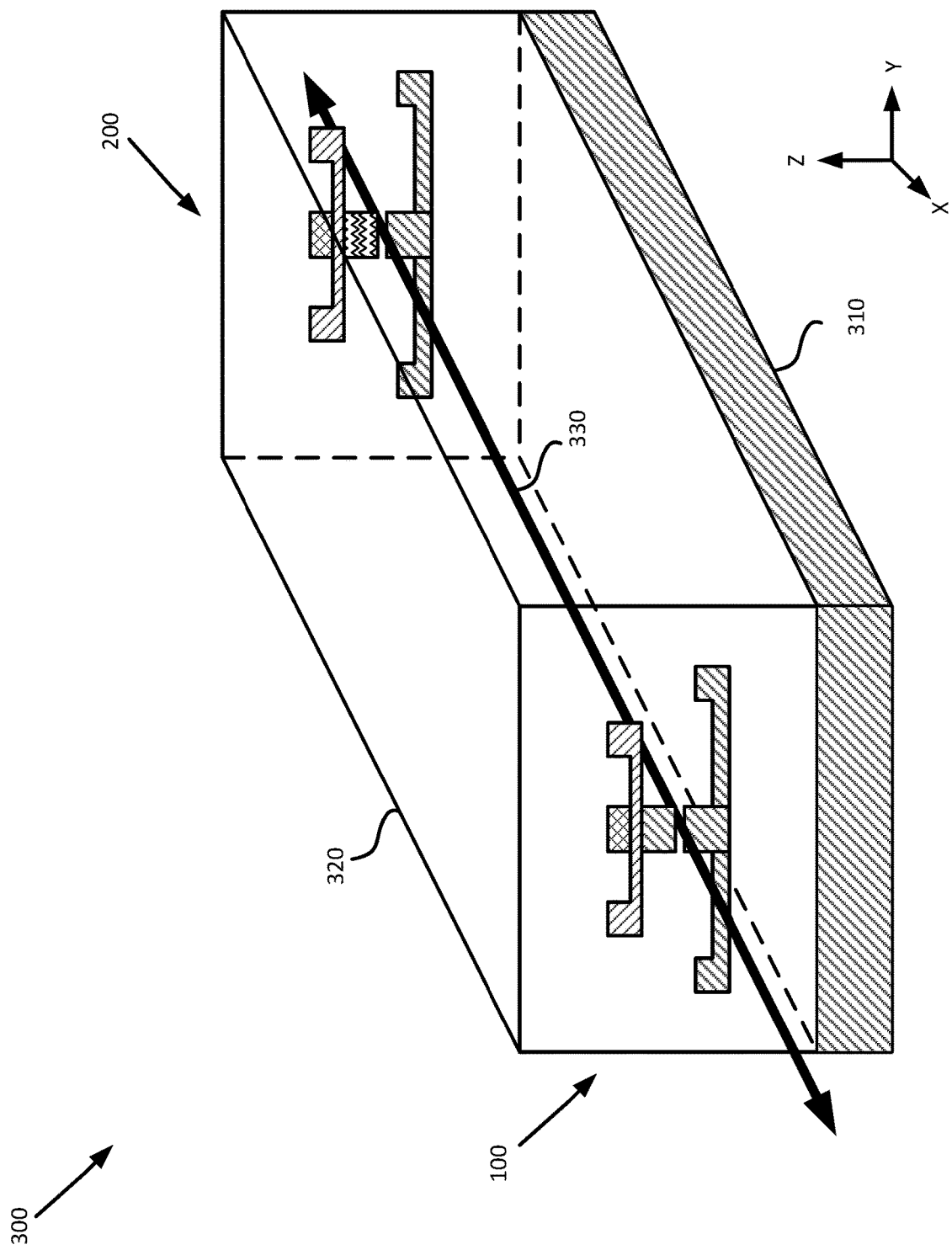
FIG. 3 illustrates a photonic platform that includes an optical modulator and an optical source, according to embodiments of the present disclosure.

FIG. 3 illustrates a photonic platform 300 that includes an optical modulator 100 and an optical source 200. The photonic platform 300 is fabricated on a silicon wafer that provides a shared substrate 310 for the optical modulator 100 and the optical source 200 (i.e., the substrate 110 of the optical modulator 100 and the substrate 210 of the optical source 200 are provided by the same wafer). Although one photonic platform is illustrated in FIG. 3, several such photonic platforms 300 may be defined as dies on a silicon wafer and processed on a wafer level.

The photonic platform includes a shared insulator 320 in which the optical modulator 100 and the optical source 200 are encased. The shared substrate 310 includes the substrate 110 of the optical modulator 100 and the substrate 210 of the optical source 200. The shared insulator 320 aligns the optical source 200 with the optical modulator 100 so that a light path 330 travels through the optical source 200 and the optical modulator 100.

Although one optical modulator 100 is illustrated in FIG. 3, in other embodiments, the photonic platform 300 includes more than one optical modulator 100. In some embodiments, optical modulators 100 are defined on opposite sides of the optical source 200 along the light path 330. In other embodiments, optical modulators 100 are defined on one side of the optical source 200.

Figure 4:
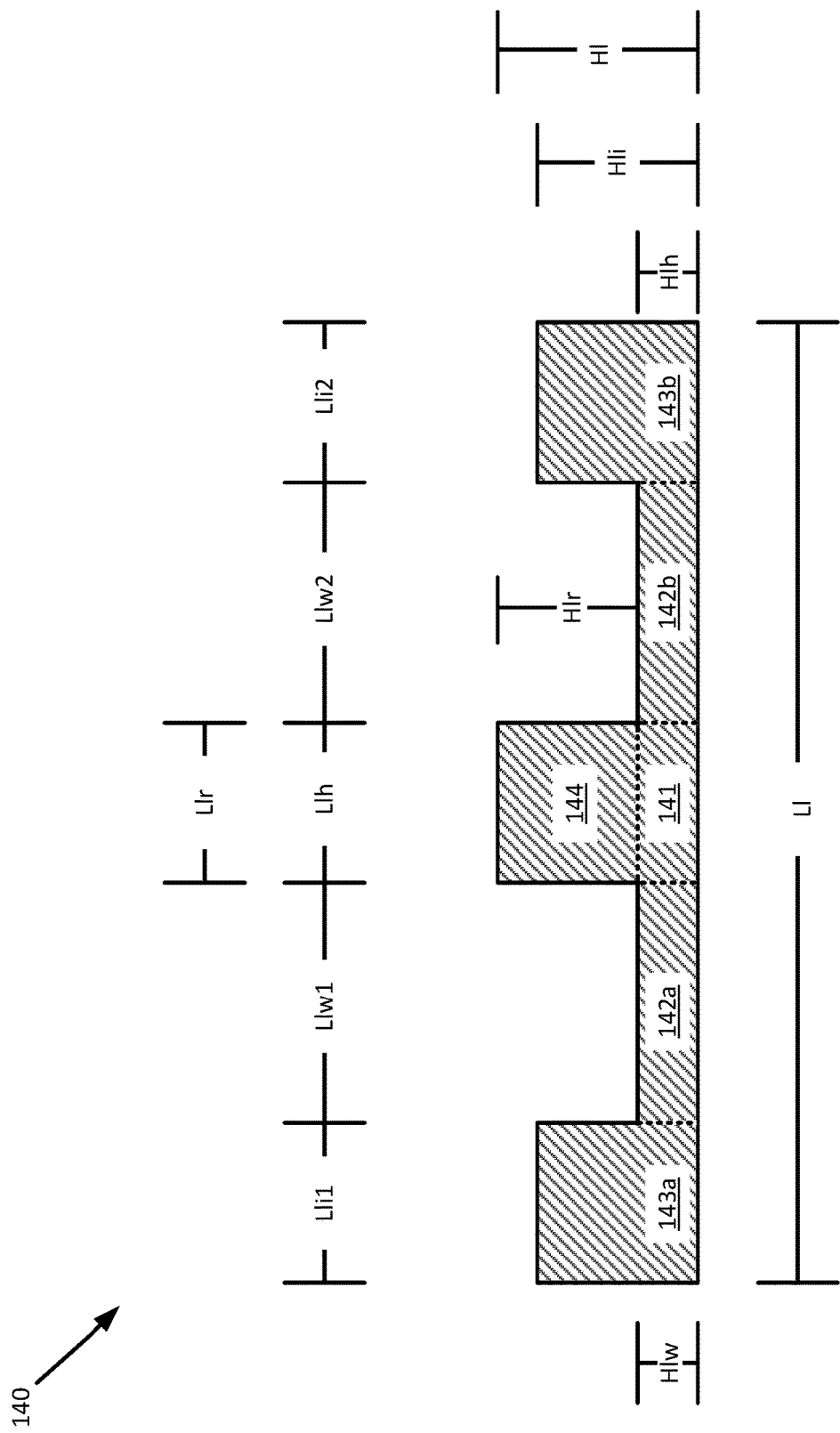
FIG. 4 illustrates a lower guide of an optical modulator, according to embodiments of the present disclosure.

FIG. 4 illustrates a lower guide 140 of an optical modulator 100, detailing various regions of the lower guide 140 and relative measurements thereof. As will be appreciated, the lower guide 240 of the optical source 200 is dimensioned equivalently to the lower guide 140 of the optical modulator 100. The total length $L_L$ of the lower guide 140 includes the length $L_{LI1}$ of the first lower interface 143a, the length $L_{LW1}$ of the first lower wing 142a, the length $L_{LH}$ of the lower hub 141, the length $L_{LW2}$ of the second lower wing 142b, and the length $L_{LI2}$ of the second lower interface 143b. The total height $H_L$ of the lower guide 140 is defined by the combined height $H_{LH}$ of the lower hub 141 and the height $H_{LR}$ of the lower ridge 144, which is equal to or greater than the height $H_{LI}$ of the lower interfaces 143.

The lower hub 141 is dimensioned with a height $H_{LH}$ and a length $L_{LH}$. The height $H_{LH}$ of the lower hub 141 is dimensioned to be the same as the height $H_{LW}$ of the lower wings 142 (which may be the same as the height $H_{LI}$ of the lower interfaces 143 in some embodiments). The length $L_{LH}$ of the lower hub 141 is dimensioned to be the same as the length $L_{LR}$ of the lower ridge 144. The height $H_{LR}$ of the lower ridge 144 defines how far the lower ridge 144 extends upward from the lower hub 141, and may vary in different embodiments.

Each of the lower interfaces 143 share a height $H_{LI}$, which may be more than the height $H_{LW}$ of the lower wings 142 (as is illustrated in FIG. 4), or may be equal to the height $H_{LW}$ of the lower wings 142 in other embodiments. Similarly, each of the lower wings 142 share the height $H_{LW}$, and the length $L_{LW1}$ of the first lower wing 142a is equal to the length $L_{LW2}$ of the second lower wing 142b. The lengths $L_{LW1}$ and $L_{LW2}$ define how far the first lower wing 142a and the second lower wing 142b extend from the lower hub 141 respectively. The individual lengths and heights of the lower wings 142 and the lower interfaces 143 may vary in different embodiments.

Figure 5A:
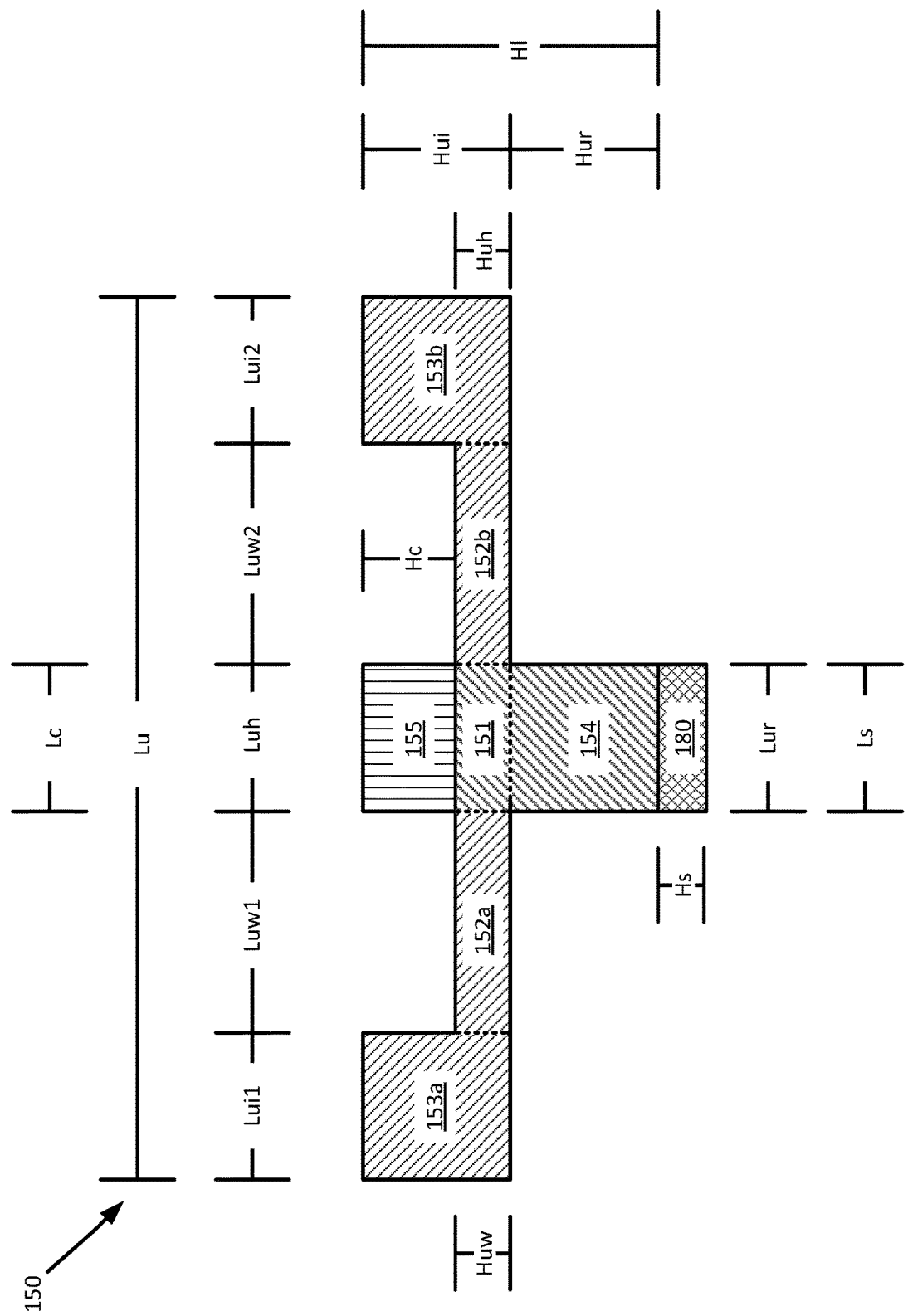
FIG. 5A-5C illustrate various embodiments of an upper guide of an optical modulator, according to embodiments of the present disclosure.
Figure 5B:
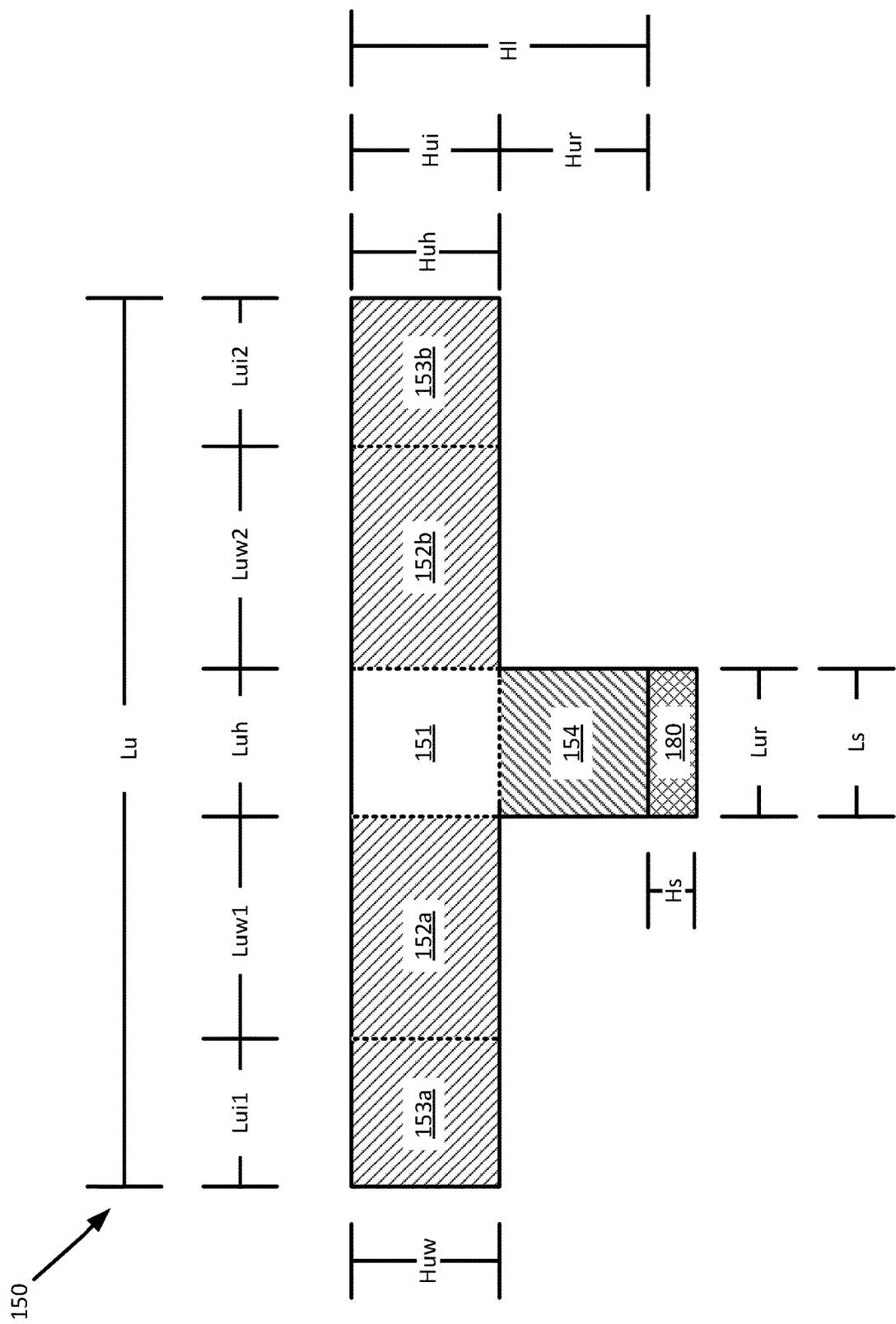
Figure 5C:
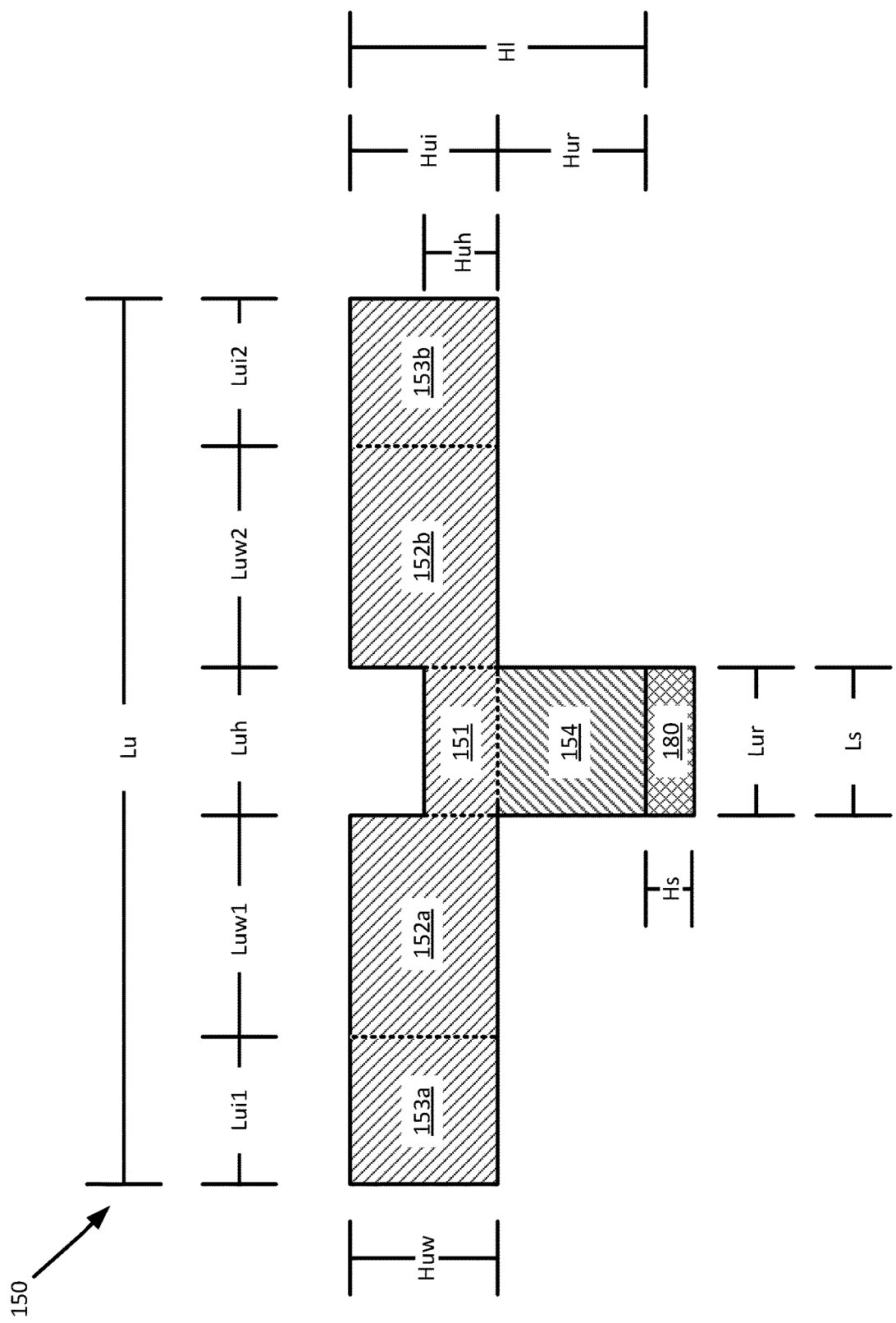

FIGS. 5A-5C illustrate various embodiments of an upper guide 150 of an optical modulator 100, detailing various regions of the upper guide 150 and relative measurements thereof. As will be appreciated, the upper guide 250 of the optical source 200 is dimensioned equivalently to the upper guide 150 of the optical modulator 100, albeit with the active region 254 replacing the upper ridge 154. Reference will be made to the dimensions of the lower guide 140 discussed in relation to FIG. 4, as the upper guide 150 and the lower guide 140 are dimensioned with respect to one another.

The total length $L_U$ of the upper guide 150 includes the length $L_{UI1}$ of the first upper interface 153a, the length $L_{UW1}$ of the first upper wing 152a, the length $L_{UH}$ of the upper hub 151, the length $L_{UW2}$ of the second upper wing 152b, and the length $L_{UI2}$ of the second upper interface 153b. The lengths LU and LL of the guides are proportioned relative to one another to allow the contacts 160 to run to and make electrical contact with one of the guides and not the other. For example, in embodiments in which the contacts 160 run from a surface above the upper guide 150 and the lower guide 140 to the guides (as illustrated in FIG. 1), the length $L_U$ of the upper guide 150 is less than the length $L_L$ of the lower guide 140. In other embodiments, the relative lengths $L_U$ and $L_L$ of the upper guide 150 and the lower guide 140 may vary to accommodate different arrangements of the contacts 160.

The total height $H_U$ of the upper guide 150 is defined by the combined height of the taller of the height $H_{UI}$ of the upper interfaces 153 or the cap 155 (if included), the height $H_{UH}$ of the upper hub 151, and the height $H_{UR}$ of the upper ridge 154. In the optical source 200, the dimensions of the active region 254 are matched with those of the upper ridge 154 of the optical modulator 100, and the total height thereof substitutes the height of the active region 254 for the height of the upper ridge 154.

When included, the cap 155 is dimensioned with a height $H_C$ and a length $L_C$. In some embodiments, the combined height $H_C$ of the cap 155 and the height $H_{UH}$ of the upper hub 151 is matched with the height $H_{UI}$ of the upper interfaces 153. In some embodiments, the length $L_C$ of the cap 155 is matched with the length $L_{UH}$ of the upper hub 151.

Although not part of the upper guide 150, the dimensions of the epitaxial layer 180 are presented in FIGS. 5A-5C for reference. The height $H_S$ of the epitaxial layer 180 (and in some embodiments the gate oxide 130) defines an amount of vertical space between the lower ridge 144 and the upper ridge 154. The length $L_S$ of this space between the upper guide 150 and the lower guide 140 is equal to the length $L_{UR}$ of the upper ridge 154 and the length $L_{LR}$ of the lower ridge 144.

The upper hub 151 is dimensioned with a height $H_{UH}$ and a length $L_{UH}$. The height $H_{UH}$ of the upper hub 151 is dimensioned to be the same as the height $H_{UW}$ of the upper wings 152 (which may be the same as the height $H_{UI}$ of the upper interfaces 153 in some embodiments). The length $L_{UH}$ of the upper hub 151 is dimensioned to be the same as the length $L_{UR}$ of the upper ridge 154. The height $H_{UR}$ of the upper ridge 154 defines how far the upper ridge 154 extends downward from the upper hub 151, and may vary in different embodiments. In some embodiments, the height $H_{UR}$ of the upper ridge 154 is equal to the height $H_{LR}$ of the lower ridge 144, but in other embodiments the upper ridge 154 and the lower ridge 144 may extend for different heights $H_{UR}$ and $H_{LR}$.

Each of the upper interfaces 153 share a height $H_{UI}$, which may be more than the height $H_{UW}$ of the upper wings 152, or may be equal to the height $H_{LW}$ of the upper wings 152 in other embodiments. Similarly, each of the upper wings 152 share a given height $H_{UW}$, and the length $L_{UW1}$ of the first upper wing 152a is equal to the length $L_{UW2}$ of the second upper wing 152b. The lengths $L_{UW1}$ and $L_{UW2}$ define how far the first upper wing 152a and the second upper wing 152b extend from the upper hub 151 respectively. The individual lengths and heights of the upper wings 152 and the upper interfaces 153 may vary in different embodiments.

FIGS. 5A-5C illustrate embodiments of an upper guide 150 with different dimensions and upper hubs 151 made of different materials.

In the embodiment illustrated in FIG. 5A, the upper hub 151 is made of the same mono-Si material as the upper ridge 154. In such an embodiment, the upper hub 151 and the upper ridge 154 may be formed from one layer of the Mono-Si material and share a common crystal matrix, but the upper hub 151 defines a region from which the upper wings 152, formed from a Poly-Si material, extend laterally in opposite directions. In FIG. 5A, the length $L_{UH}$ matches the length $L_{UR}$, the height $H_{UW}$ matches the height $H_{UH}$, and the $H_{UI}$ is greater than the $H_{UW}$. A cap 155 is optionally included in the embodiment illustrated in FIG. 5A, and is dimensioned with a height $H_C$ that positions an upper surface of the cap 155 on a plane with the upper surfaces of the upper interfaces and a length $L_C$ that matches the length $L_{UH}$ of the upper hub 151.

FIG. 5B illustrates an embodiment in which the upper guide 150 includes an upper hub 151 formed from a single crystal of silicon (i.e., a single crystal silicon hub), grown from the mono-Si upper ridge 154. Although the single-crystal upper hub 151 is illustrated with a length $L_{UH}$ matching the length $L_{UR}$ of the upper ridge 154, in other embodiments, a single-crystal upper hub 151 may have a length $L_{UH}$ greater than length $L_{UR}$. In FIG. 5B, the height $H_{UH}$ matches the height $H_{UW}$ and the height $H_{UI}$.

FIG. 5C illustrates an embodiment in which the upper guide 150 includes an upper hub 151 formed from the Poly-Si material used in the upper wings 152 and upper interfaces 153. The upper hub 151 is dimensioned with a height $H_{UH}$ that is less than the matched heights $H_{UW}$ and $H_{UI}$, and with a length $L_{UH}$ that matches the length $L_{UR}$ of the upper ridge 154. In embodiments using a Poly-Si upper hub 151, the upper hub 151 is doped with a lower concentration of dopants than the upper wings 152 or upper interfaces 153.

Figure 6:
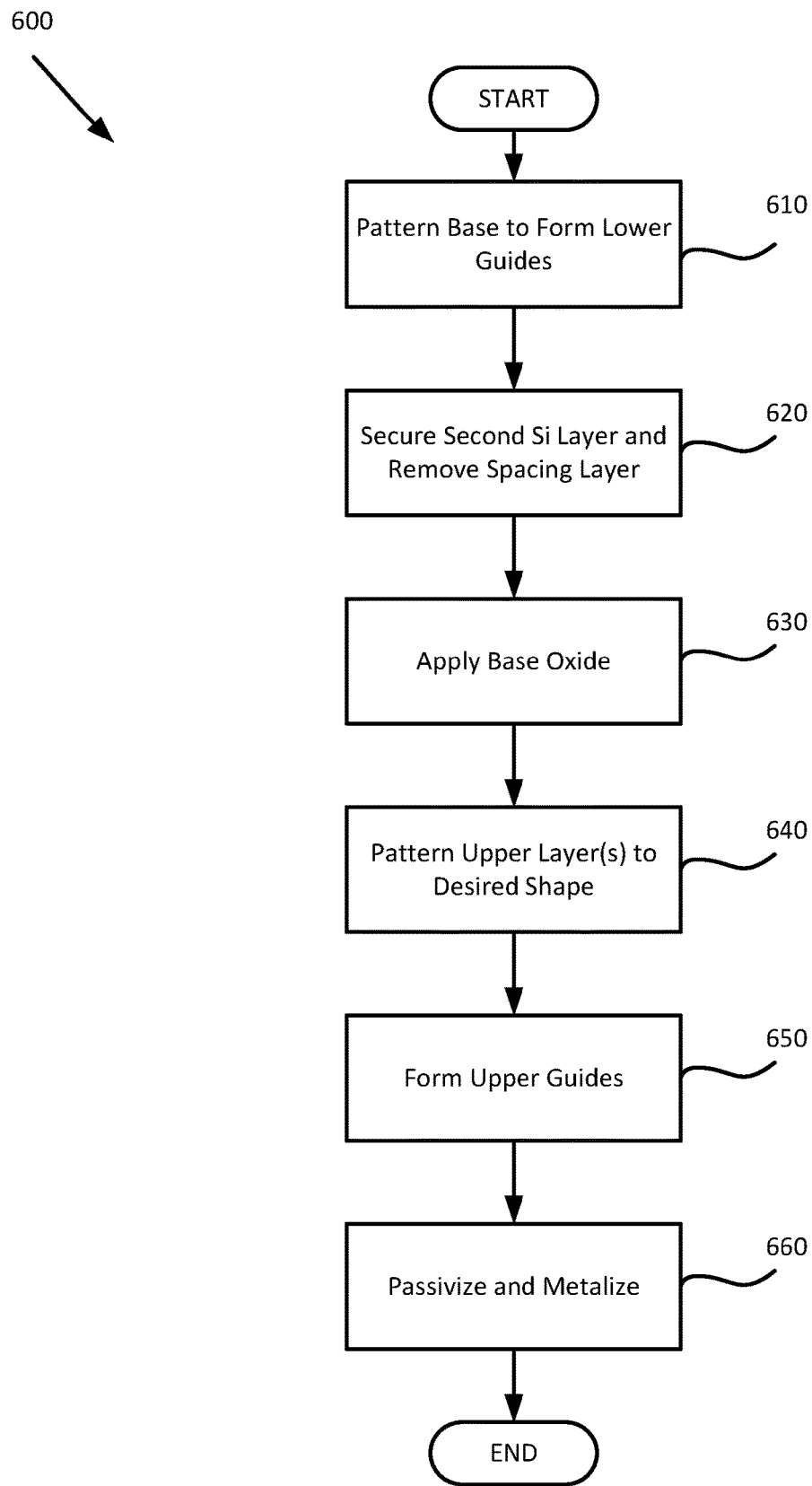
FIG. 6 is a flowchart of a method for forming an optical modulator, according to embodiments of the present disclosure.

FIG. 6 is a flowchart of a method 600 for forming an optical modulator 100 that is part of a photonic platform 300 according to embodiments of the present disclosure. For clarity, the method 600 is described in conjunction with FIGS. 7A-7M, which illustrate various components and arrangements of features of an optical modulator 100 at different times during formation.

Figure 7A:
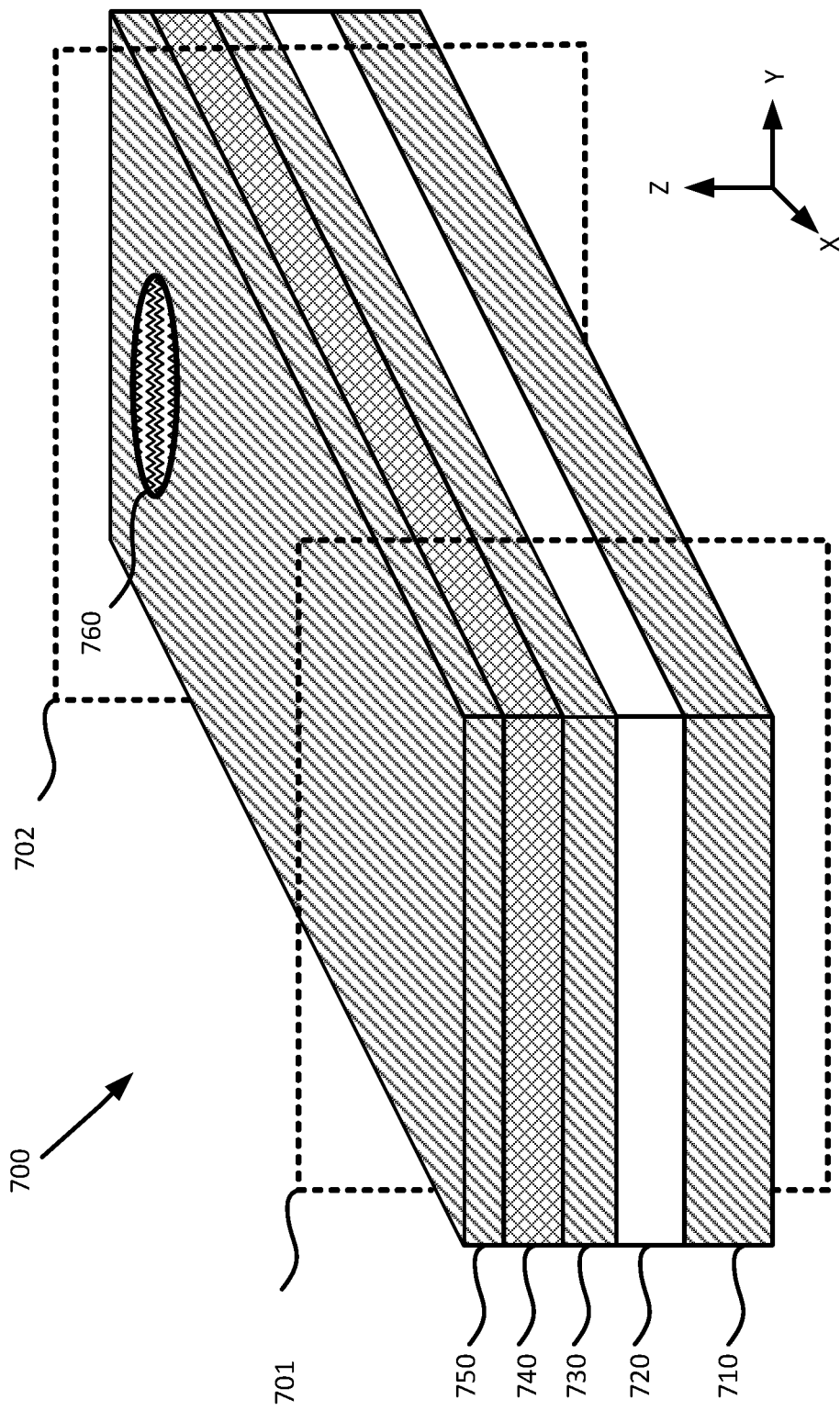
FIGS. 7A-7M illustrate various components and arrangements of features of an optical modulator at different times during formation, according to embodiments of the present disclosure.

For example, FIG. 7A illustrates a base component 700, which may be one of several dies defined on a wafer. The base component 700 includes a substrate layer 710, such as the substrate of a Silicon wafer, an insulator layer 720, such as a layer of $SiO_2$, a Silicon-On-Insulator (SOI) layer 730, such as a monocrystalline layer of Si doped to exhibit a first electrical conductivity type (e.g., one of N-type and P-type), a spacing layer 740, such as a layer of a silicon germanium (SiGe) material, and a second Si layer 750, such as a monocrystalline layer of Si doped to exhibit a second electrical conductivity type opposite to the type that the SOI layer 730 is doped for.

A first cross section 701 is indicated on the base component 700 that indicates a portion of the base component 700 at which an optical modulator 100 is defined as method 600 progresses. A second cross section 702 is indicated on the base component 700 that indicates a portion of the base component 700 at which an optical source 200 is defined as method 600 progresses.

A III-V material region 760 is defined coplanar to the second Si layer 750 and at least partially within the second cross section 702. In some embodiments, the III-V material region 760 is epitaxially grown or formed from the spacing layer 740 in several layers to define various quantum dots or quantum wells which provide lasing and/or light detection in the finished photonic platform 300. The III-V materials used in the various layers may include, but are not limited to: GaAs, GaN, GaSb, InSb, InAs, InP, etc. A fabricator may form the III-V material region 760 according to various processes either before or after the fabricator forms the second Si layer 750 on the spacing layer 740.

In some embodiments, prior to patterning the base component 700, the fabricator applies a cap layer (not illustrated) to the base component, such as a layer of silicon nitride (SiN) applied on the second Si layer 750 and the III-V material region 760. In other embodiments, the fabricator omits a cap layer when fabricating a photonic platform 300.

Figure 7B:
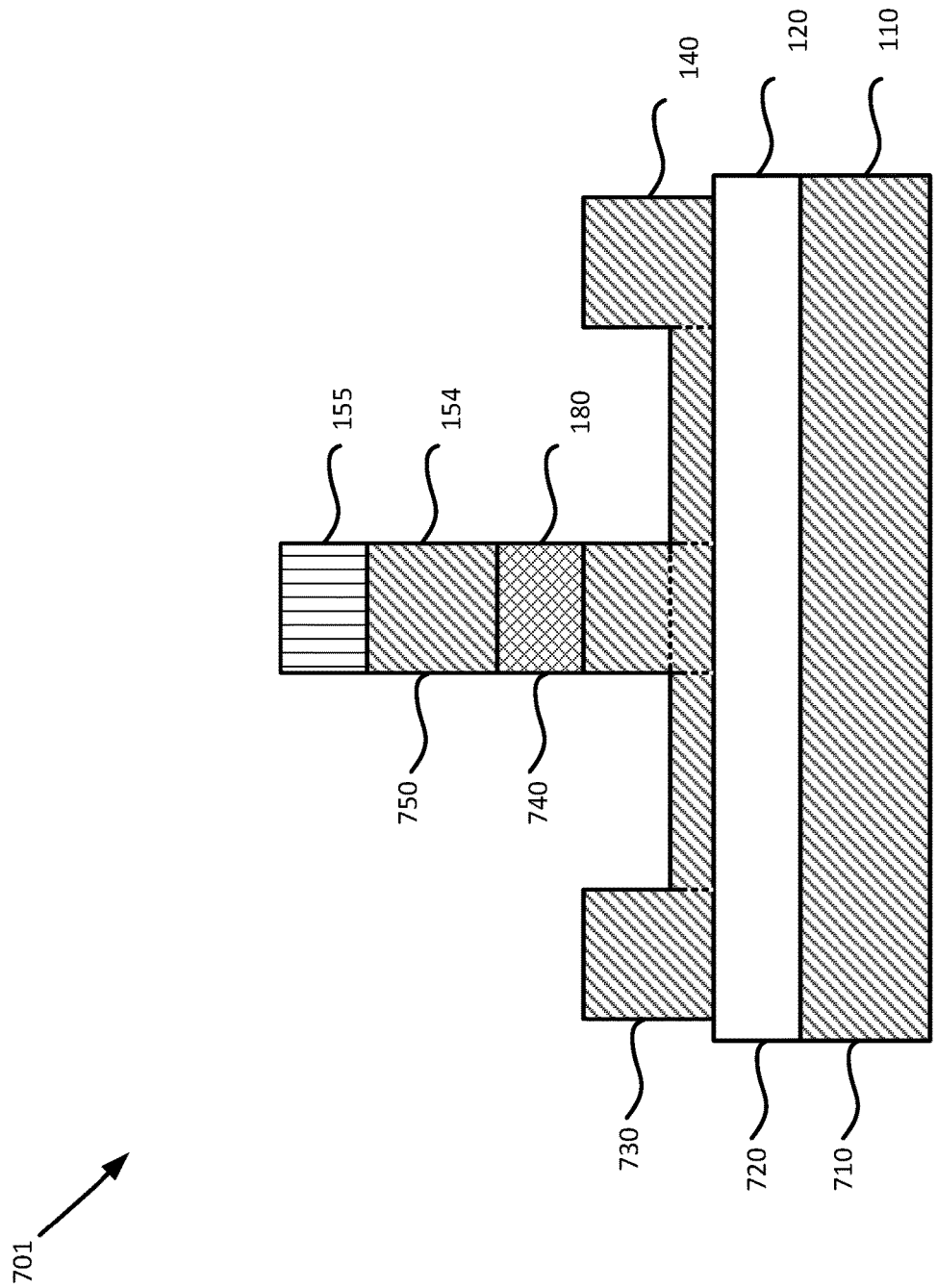
Figure 7C:
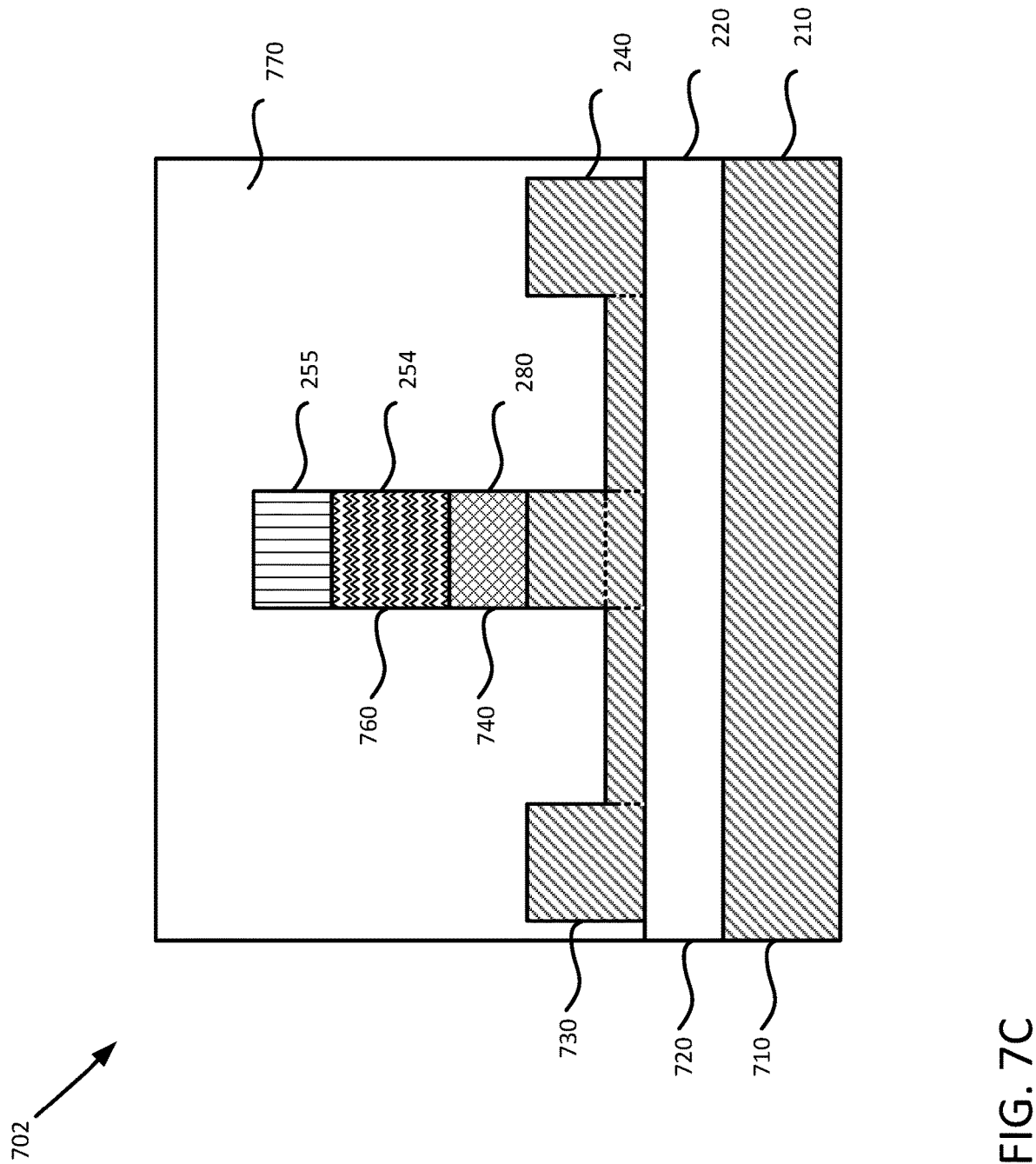

Method 600 begins with block 610, where a fabricator patterns a base component 700 to form the lower guides 140, 240. FIG. 7B illustrates the first cross-section 701 with the lower guide 140 for the optical modulator 100 and FIG. 7C illustrates the second cross-section 702 with the lower guide 240 for the optical source 200 encased in an anchor material 770 (per block 610).

At block 610, the fabricator may use various chemical and physical etching processing to remove material from the cap layer (if present), the second Si layer 750 and III-V material region 760, the spacing layer 740, and the SOI layer 730 to shape the lower guides 140, 240 into a predefined shape. The fabricator defines the lower guides 140, 240 from the SOI layer 730, and leaves a portion of the spacing layer 740 as the epitaxial layers 180, 280 to support a portion of the second Si layer 750 and III-V region 760 in the first cross section 701 and the second cross section 702 respectively. The remaining portion of the second Si layer 750 forms the basis for the upper ridge 154 (and in some embodiments, the upper hub 151). The remaining portion of the III-V region 760 forms the basis for the active region 254 (and in some embodiments, the upper hub 251). In embodiments that include a cap layer, any remaining portion of the cap layer forms the caps 155, 255.

At block 620, the fabricator secures the remaining portions of the second Si layer 750 via an anchor material 770, and removes the spacing layer 740. The fabricator applies an anchor material 770, such as amorphous Carbon material, to temporarily support the second silicon layer 750 when the spacing layer 740 is removed. In various embodiments, the fabricator embeds the optical source 200 in the anchor material 770 and leaves the optical modulator 100 exposed. In some embodiments, the fabricator embeds portions of the base component 700 that do not include the optical source 200 in the anchor material 770, for example, to support the optical modulator 100 on two sides and/or to leave the optical source 200 exposed.

The fabricator removes the exposed portions of the spacing layer 740 by using various chemical or physical etching processes; leaving remaining portion of the exposed second Si layer 750 suspended above the lower guide(s) 140, 240. For example, the fabricator may use a gaseous etch with $HCl/H_2$ gas to selectively etch away exposed SiGe in a spacing layer 740 embedded between the SOI layer 730 and second Si layer 750.

In some embodiments, the fabricator retains the portions of the spacing layer 740 that are embedded in the anchor material 770 and are not otherwise exposed. For example, the spacing layer 740 in the second cross section 702 shown in FIG. 7C may be retained in the final optical source 200. In other embodiments, the fabricator retains the portions of the spacing layer 740 that are embedded in the anchor material 770, but removes those portions of the spacing layer 740 in a subsequent etching process when the second Si layer 750 in the optical modulator 100 is physically supported above the lower guide 140, for example, via a gate oxide 130.

Figure 7D:
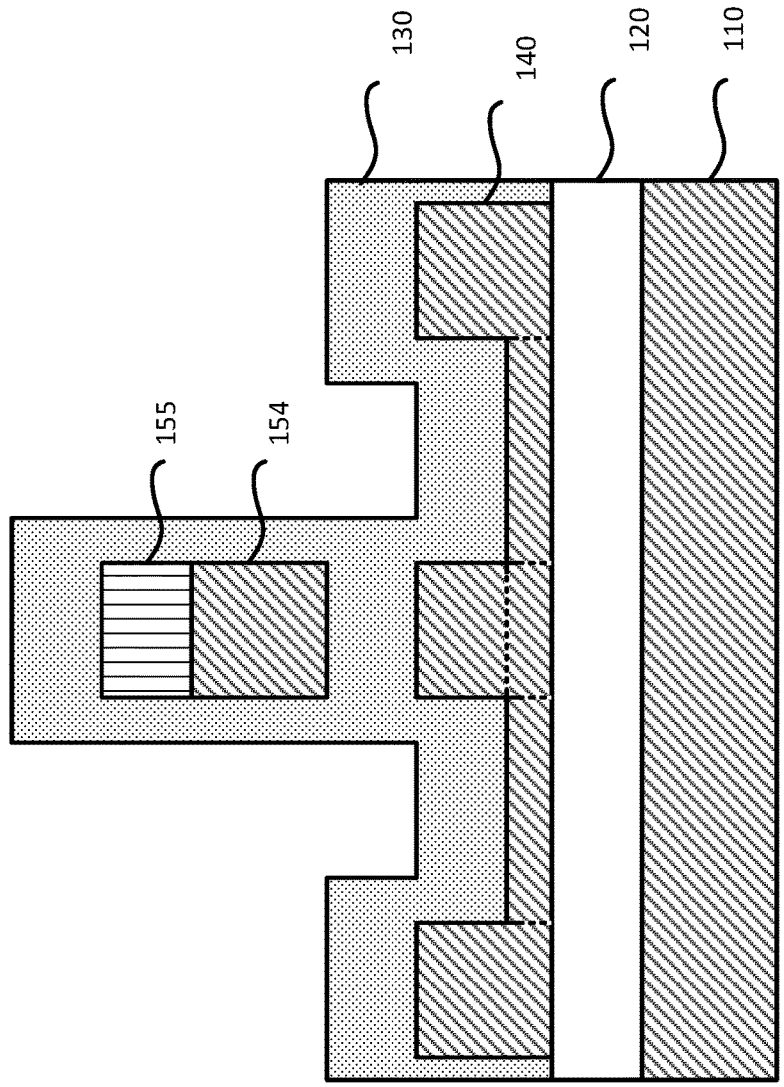
Figure 7E:
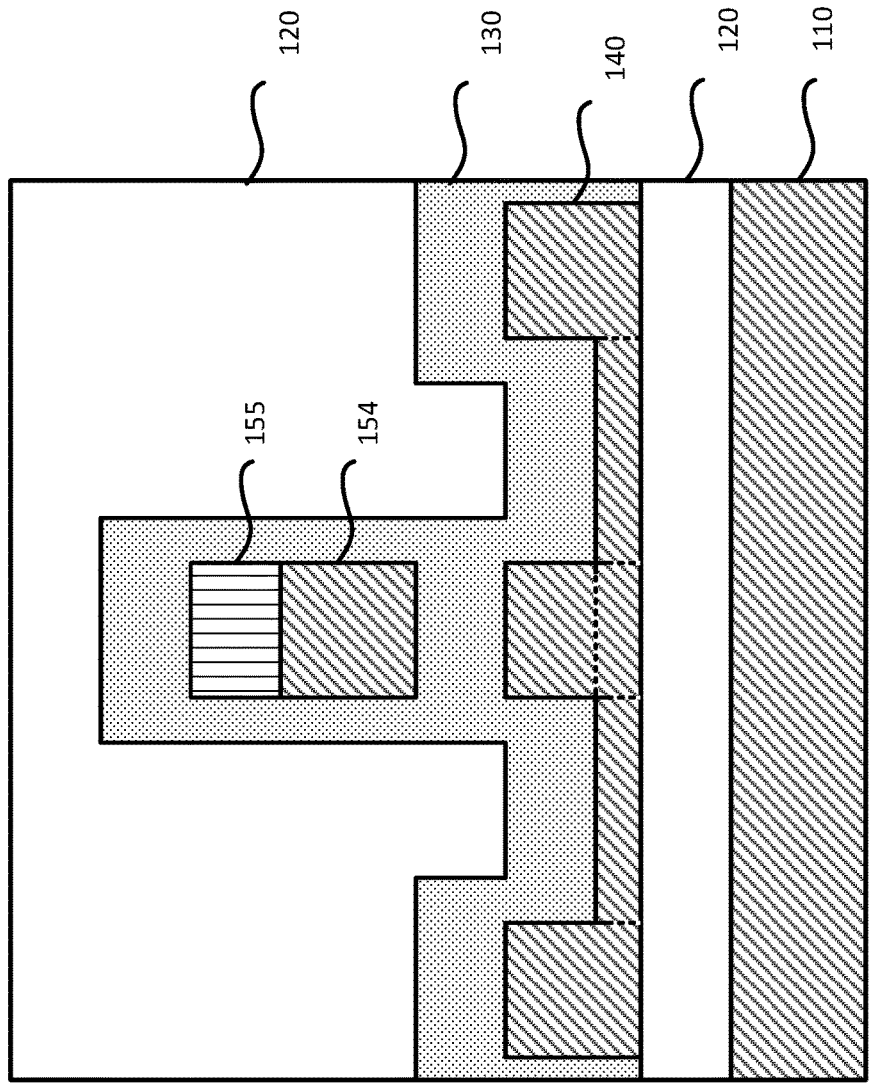

At block 630, the fabricator applies a gate oxide 130 and insulator 120 to the lower guides 140, 240. FIG. 7D illustrates the first cross section 701 in which the gate oxide layer 130 has been applied to the lower guide 140. FIG. 7E illustrates the first cross section 701 in which the additional insulator 120 has been applied to the gate oxide 130. Depending on where the fabricator applied the anchor material 770, the fabricator may apply the gate oxide 130 and then the insulator 120 to the lower guides 140, 240 at the same time, or to each of the lower guide 140 and the lower guide 240 in turn as an anchor material 770 is removed from an encased lower guide 140, 240. In some embodiments, the fabricator deposits the gate oxide 130 via atomic layer deposition, which backfills the space between the upper ridge 154 and the lower ridge 144 once occupied by the spacing layer 740.

Figure 7F:
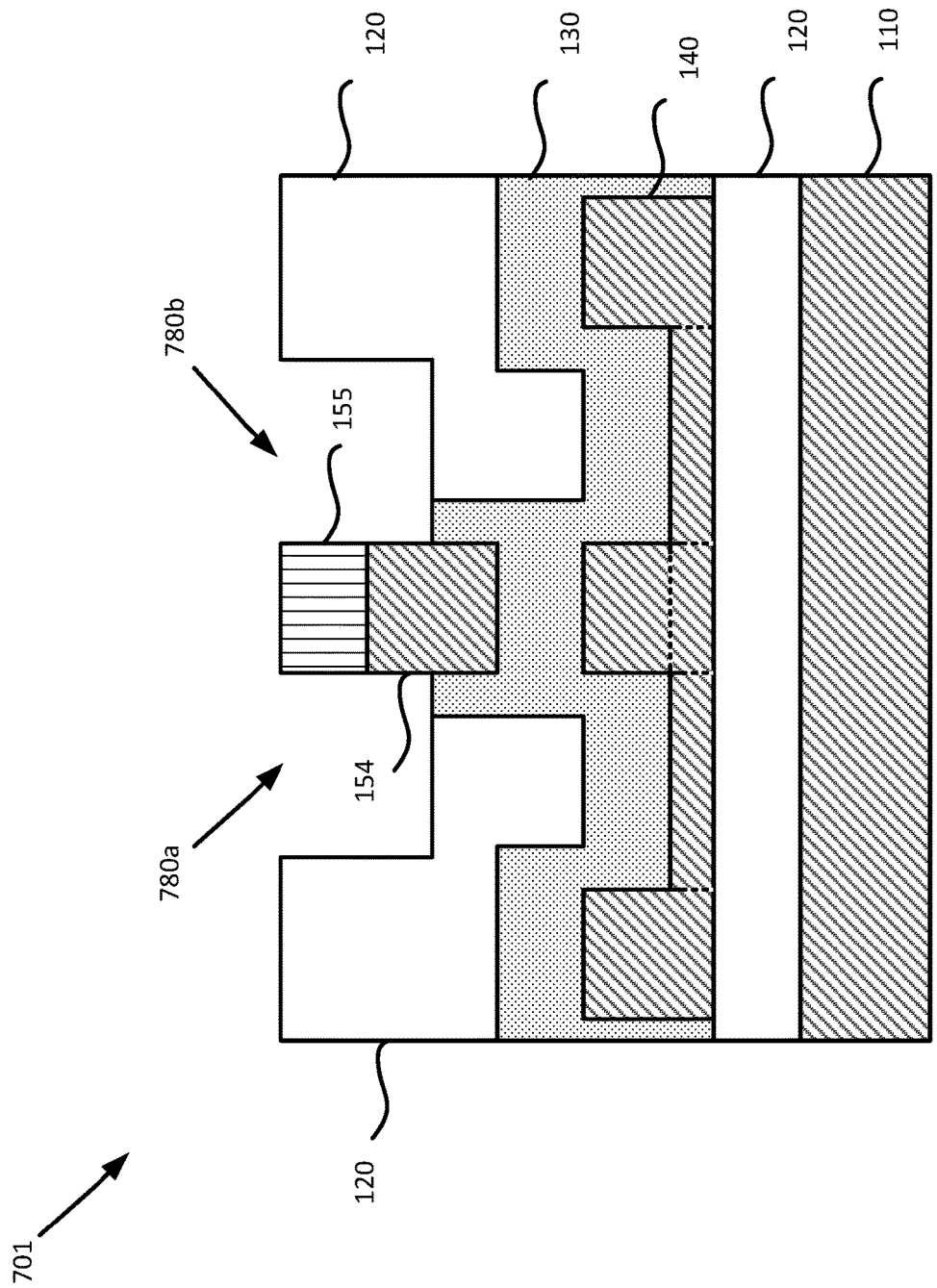
Figure 7G:
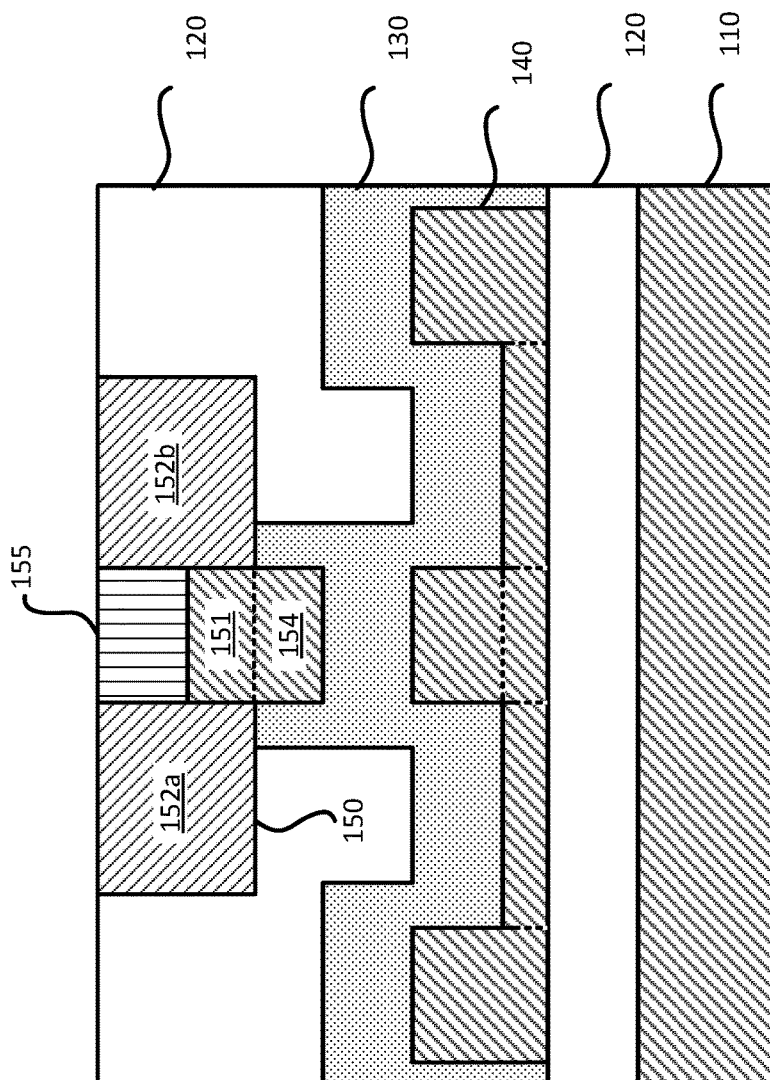
Figure 7H:
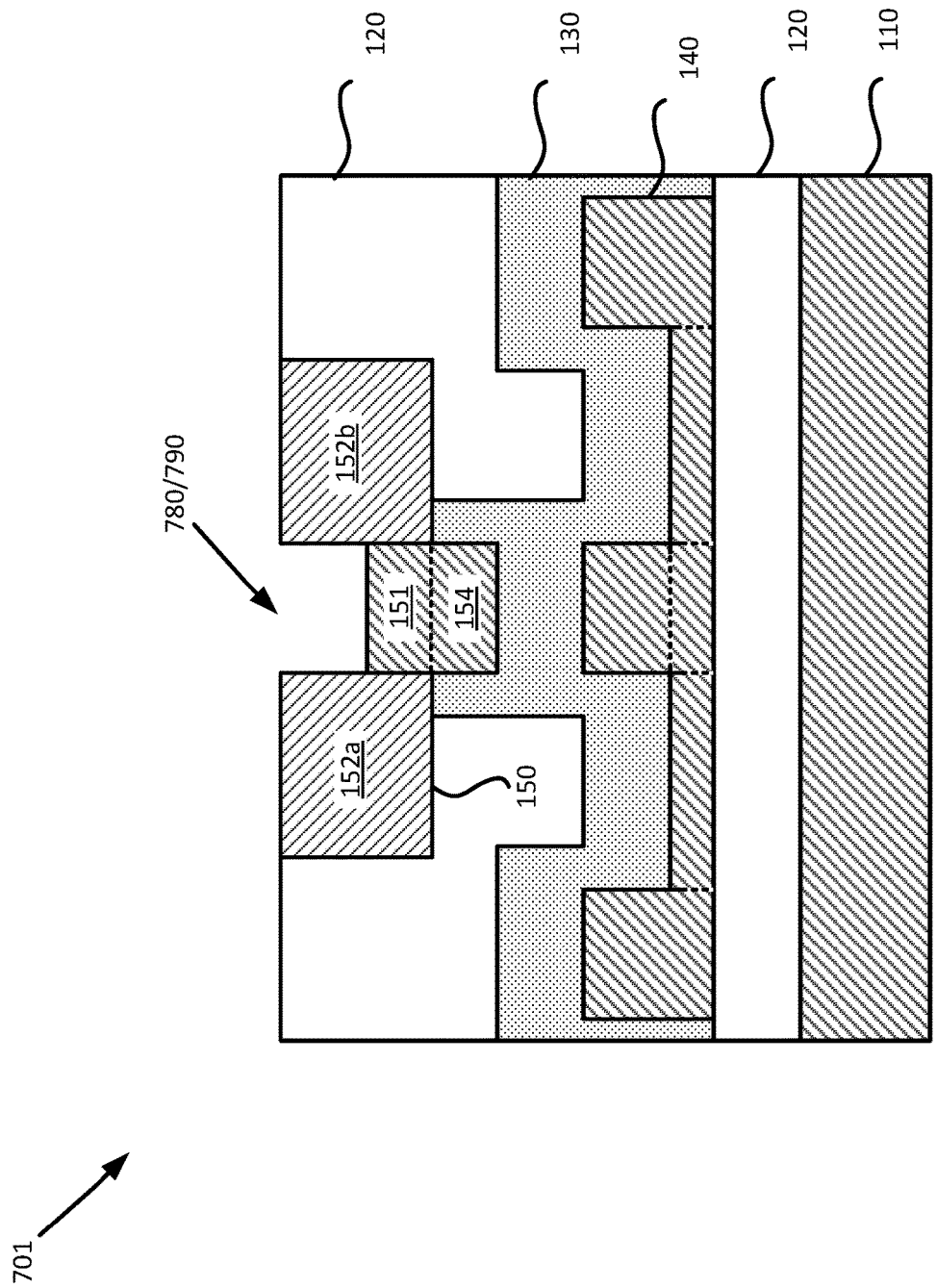
Figure 7I:
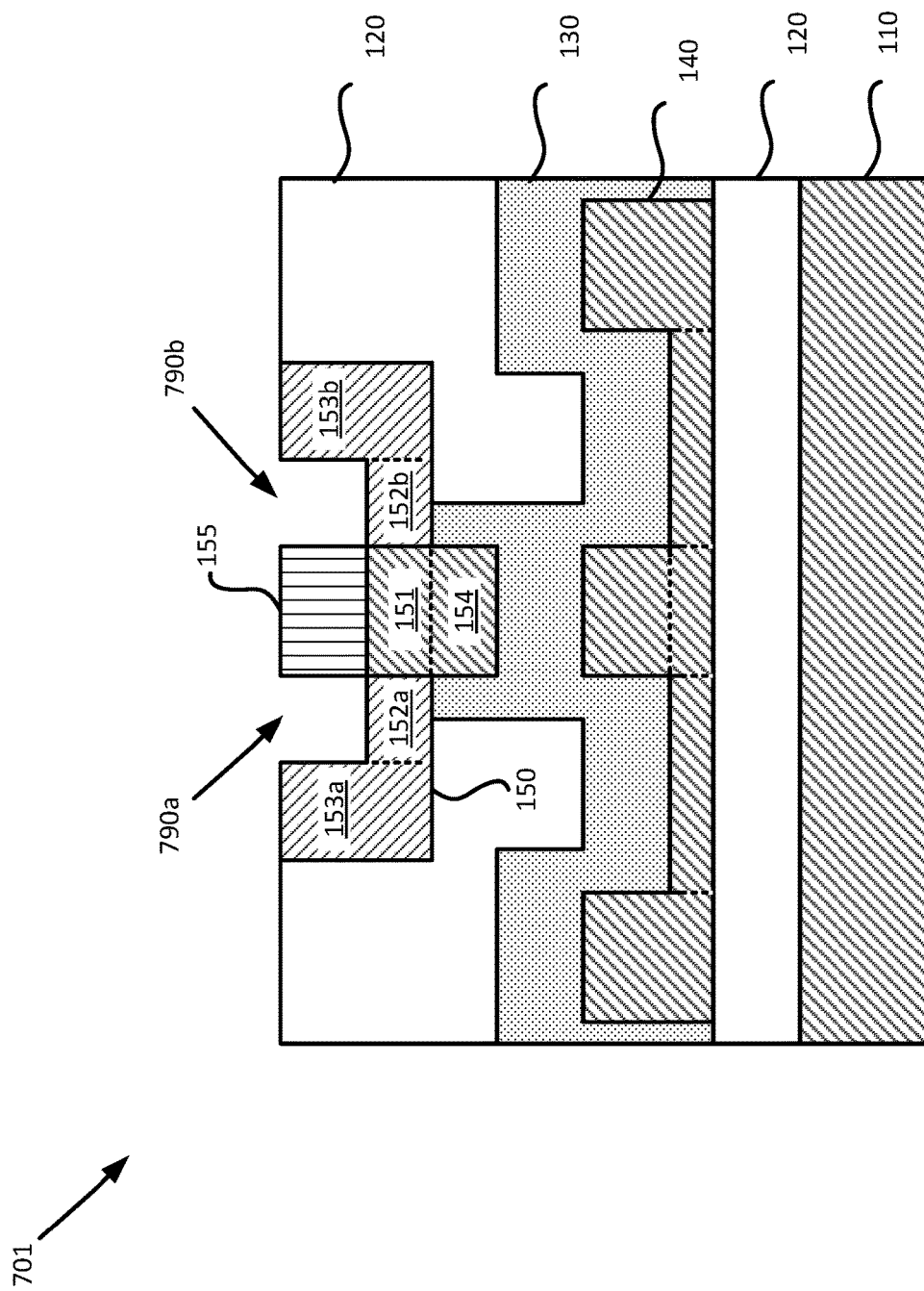
Figure 7J:
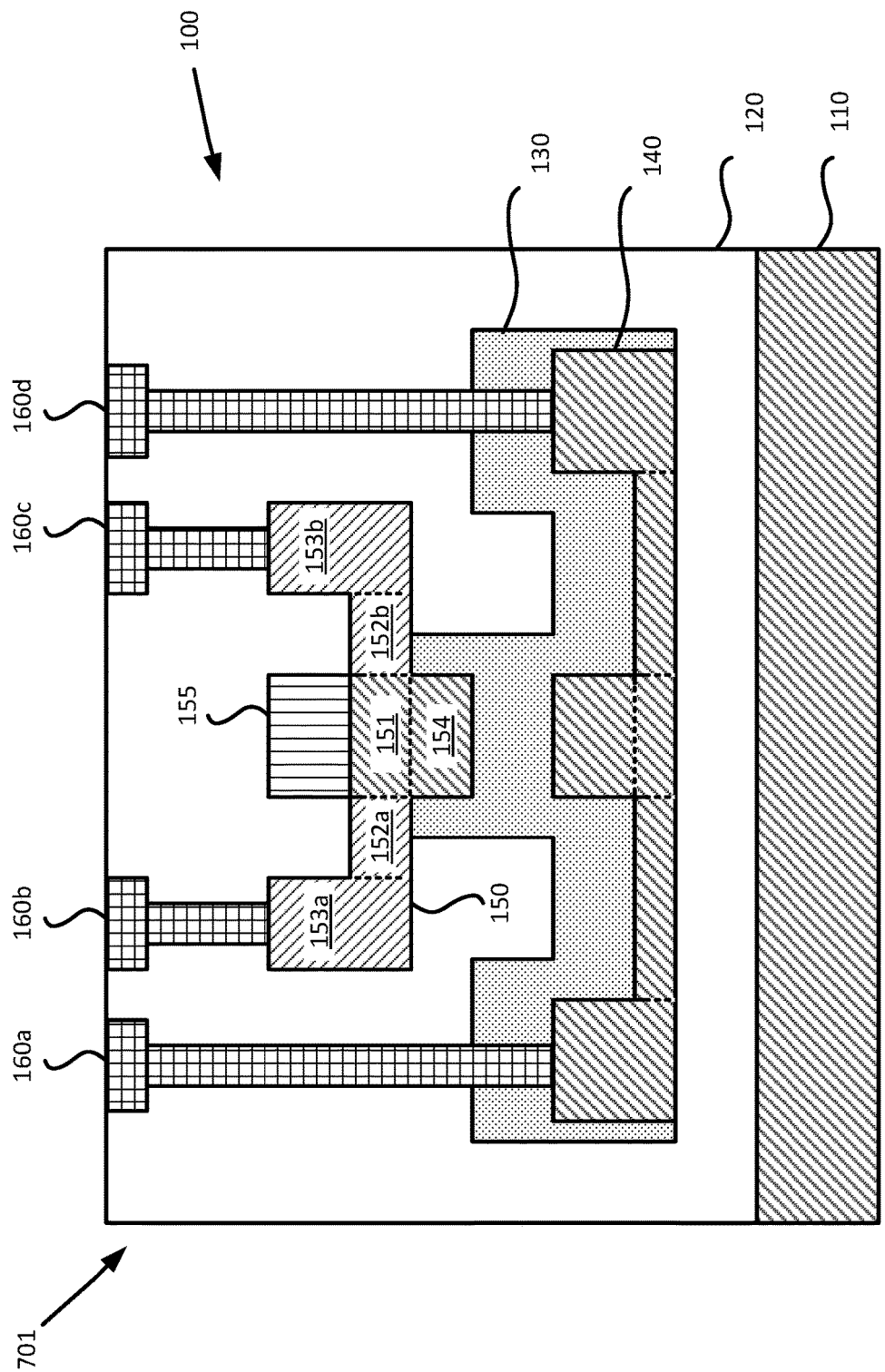
Figure 7K:
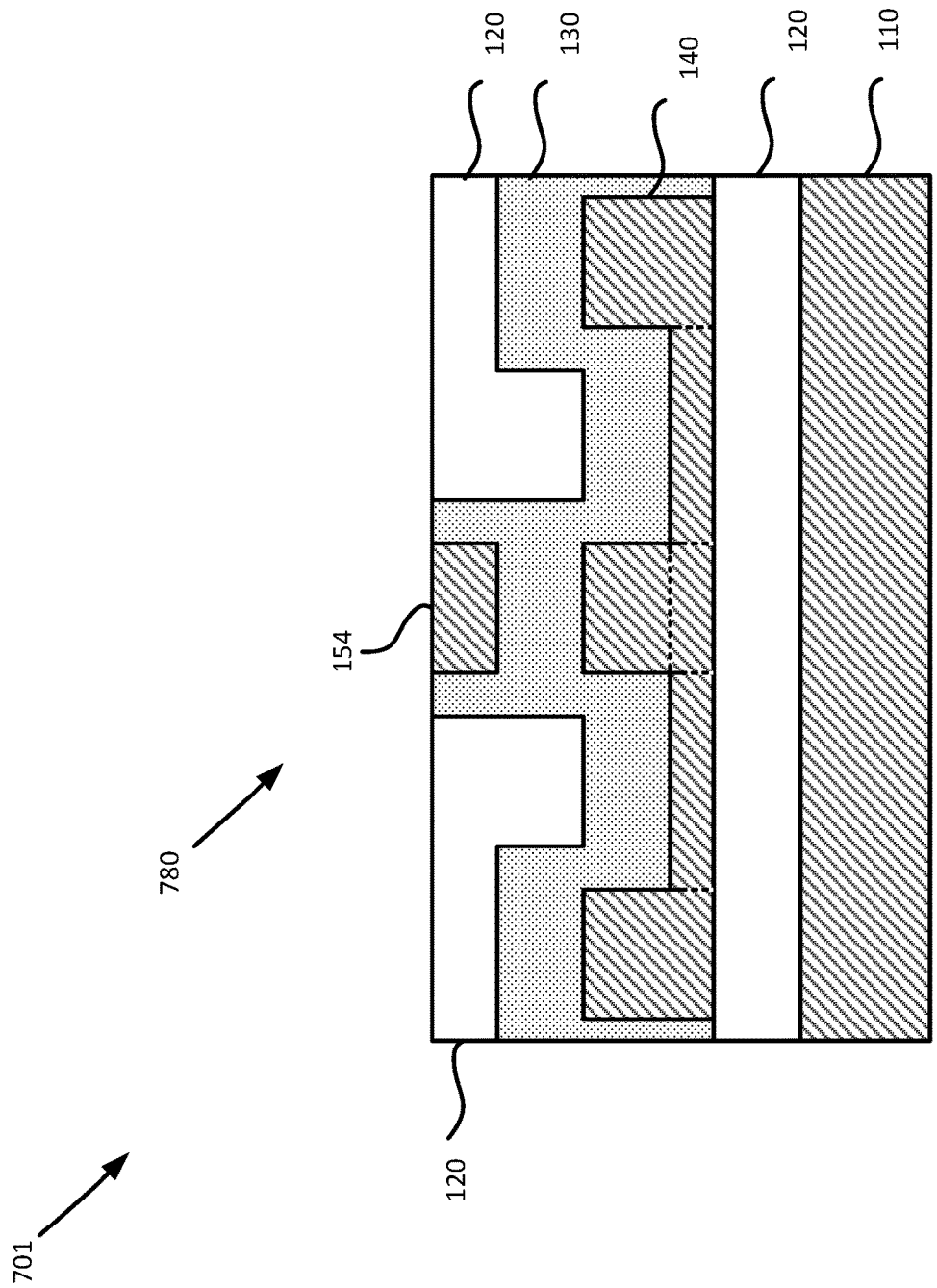

At block 640, the fabricator patterns the upper layers of the in-process photonic platform 300 into the desired shape(s). In some embodiments, the fabricator patterns the upper layers by defining a first cavity 780a and a second cavity 780b on opposite sides of the upper ridge 154, such as in the first cross section 701 illustrated in FIG. 7F. Although FIG. 7F shows that the cap 155 is not removed when patterning the upper layers of the in-process optical modulator 100, in other embodiments, the fabricator may remove the cap 155 at block 640. For example, FIG. 7K illustrates the first cross section 701 in which the fabricator patterns the upper layers by etching the upper ridge 154 to a desired height $H_{UR}$ and removing all material above an upper surface of the upper ridge 154.

Figure 7L:
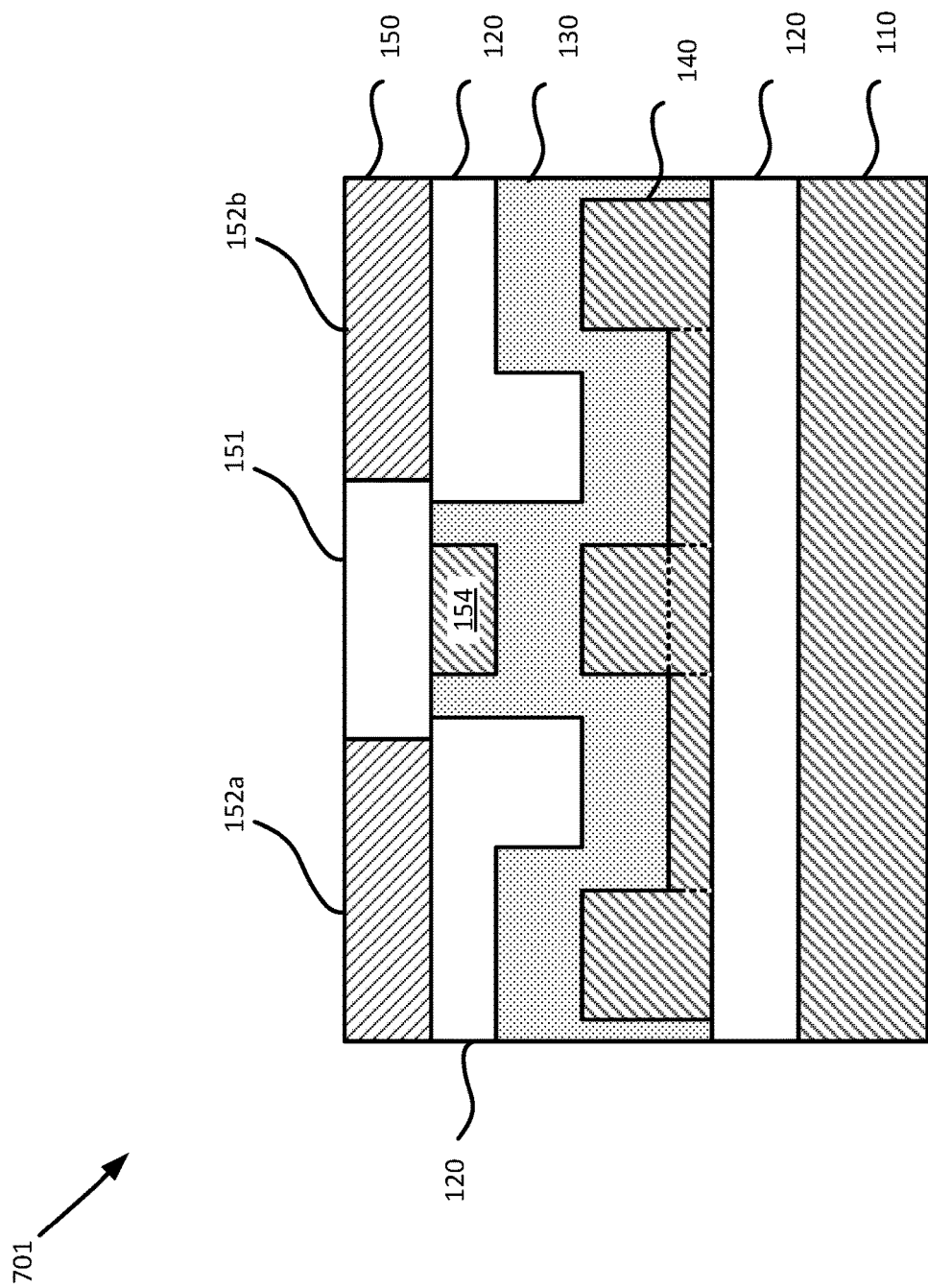

At block 650, the fabricator forms the upper guides 150, 250 into the desired shape(s). FIGS. 7G, 7H, and 7I illustrate various sequences for forming the upper guides 150 from the first cross section 701 illustrated in FIG. 7F. FIG. 7L illustrates another sequence for forming the upper guides 150 from the first cross section 701 illustrated in FIG. 7K. Similar processes are performed in the second cross section 702 to produce the upper guides 250 of the optical source 200.

FIG. 7G illustrates a first upper wing 152a and a second upper wing 152b that a fabricator has formed in the first cavity 780a (generally, cavity 780) and the second cavity 780b respectively. The upper wings 152 are made from a polycrystalline silicon that is doped to exhibit a second type of conductivity different from the first type of conductivity that the lower guide 140 is doped for. The region of the upper ridge 154 that the upper wings 152 are aligned with defines the upper hub 151 in FIG. 7G. In various embodiments, FIG. 7G illustrates a pre-passivized and pre-metalized, but otherwise final cross section for an optical modulator 100. In other embodiments, a fabricator further processes the optical modulator 100 to produce the cross sections illustrated in FIG. 7H or 7I.

FIG. 7H illustrates the first cross section 701 in which the fabricator removes the cap 155 from the in-process optical modulator 100, leaving one cavity 780 or void 790 between the upper wings 152 and above the upper hub 151. The fabricator removes the cap 155 using various chemical and physical etching processes in various embodiments.

FIG. 7I illustrates the first cross section 701 in which the fabricator differentiates the upper wings 152 from the upper interfaces 153. The fabricator removes a portion of the upper wings 152 to produce a first void 790a (generally, void 790) and a second void 790b that produces upper interfaces 153 on distal ends of the upper wings 152 (relative to the upper hub 151) that have a greater height $H_{UI}$ than the height $H_{UW}$ of the portions of the upper wings 152 that underlie the respective first void 790a and the second void 790b. The fabricator removes the portions of the upper wings 152 using various chemical and physical etching processes in various embodiments.

FIG. 7L illustrates the first cross section 701 in which the fabricator has grown or formed an upper hub 151 as a single (or near single) Silicon crystal in the cavity 780 illustrated in FIG. 7K using the upper ridge 154 as a seed. Although illustrated in FIG. 7L with a length LUH that is greater than the length LUR of the upper ridge 154, in other embodiments the length LUH may be equal to or less than the length LUR. The fabricator forms the upper wings 152 in the portions of the cavity 780 not occupied by the upper hub 151, and may physically or chemically etch the upper wings 152 and the upper hub 151 to produce a desired height $H_{UW}$ and $H_{UH}$ and surface thereon.

Figure 7M:
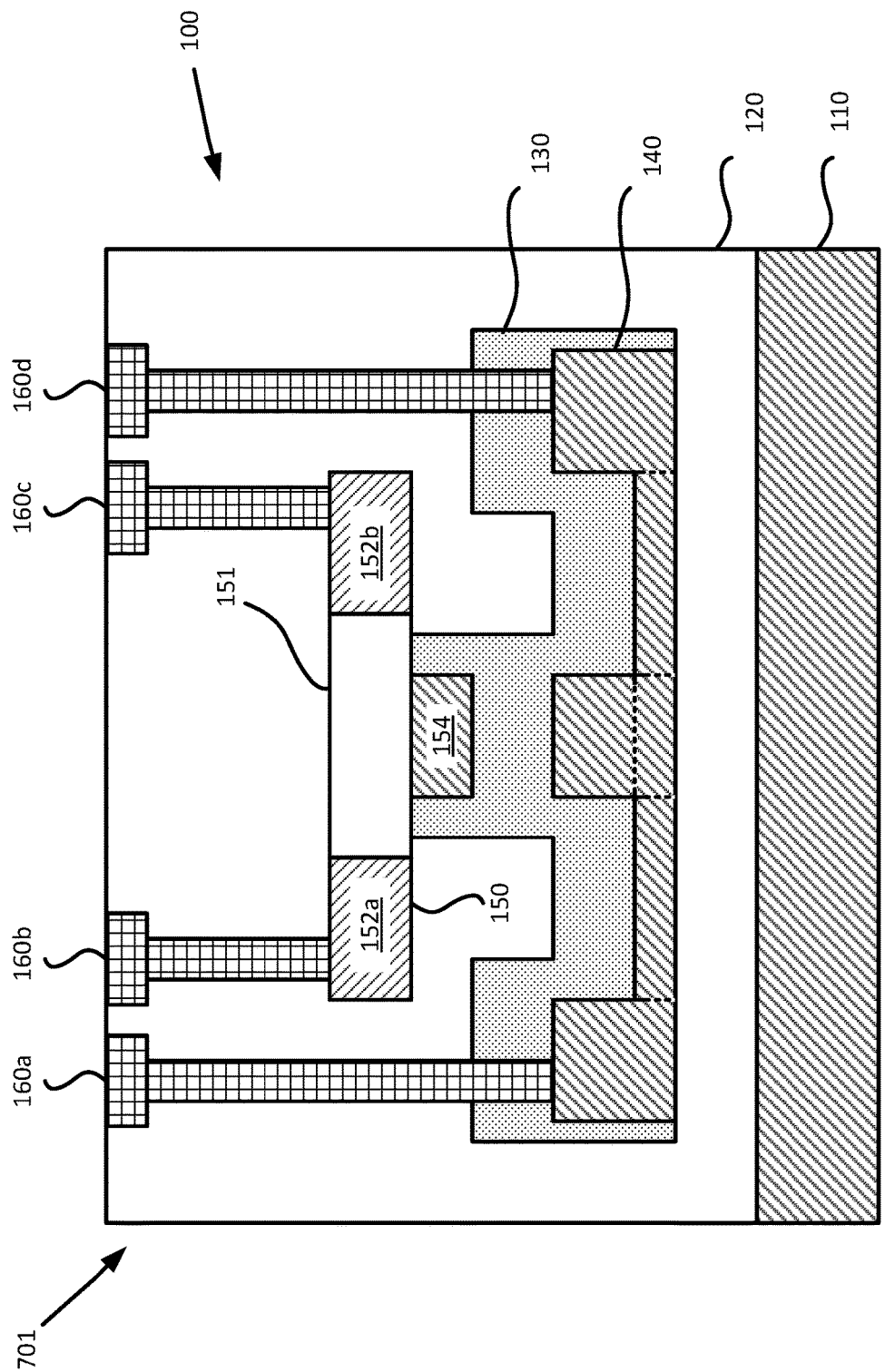

At block 660, the fabricator passivizes and metalizes the in-process photonic platform 300. The fabricator applies an additional layer of the insulator 120 to the layout of the optical modulator 100 and optical source and defines several contacts 160 through the insulator 120 to make contact with the upper guide 150 and the lower guide 140. FIG. 7J illustrates a passivized and metalized optical modulator 100 in the first cross section 701 using the layout illustrated in FIG. 7I. FIG. 7M illustrates a passivized and metalized optical modulator 100 in the first cross section 701 using the layout illustrated in FIG. 7L.

Method 600 may then conclude. The fabricator may then cleave the dies defining the photonic platforms 300 from a wafer, perform test operations on the photonic platforms 300, incorporate the photonic platforms 300 into various devices and circuits, etc.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   patterning a base component to impart:
      a lower waveguide that is separated from a substrate of the base component by a first layer of an insulator, the lower waveguide comprising:
         a lower hub, made of monocrystalline silicon;
         a lower ridge, made of monocrystalline silicon that extends in a first direction from the lower hub;
         a first lower wing, made of monocrystalline silicon, that extends in a third direction, perpendicular to the first direction, from the lower hub;
         a second lower wing, made of monocrystalline silicon, that extends in a fourth direction, opposite from the third direction, from the lower hub;
         a first lower interface, made of monocrystalline silicon, located on a distal end of the first lower wing relative to the lower hub and extending upward in the first direction from the first lower wing; and
         a second lower interface, made of monocrystalline silicon, located on a distal end of the second lower wing relative to the lower hub and extending in the first direction from the second lower wing;
      an upper ridge for an upper waveguide that is located above the lower waveguide and is separated from the lower waveguide by a predefined height;
   depositing a gate oxide layer on the lower waveguide;
   depositing a second layer of the insulator on the gate oxide layer;
   etching the second layer of the insulator to define a cavity of a predefined shape; and
   forming polycrystalline silicon wings for the upper waveguide in the cavity.

2. The method of claim 1, wherein the polycrystalline silicon wings for the upper waveguide include:
   an upper hub, made of polycrystalline silicon, that extends in the first direction from the upper ridge;
   a first upper wing, made of polycrystalline silicon, that extends in the third direction from the upper hub;
   a second upper wing, made of polycrystalline silicon, that extends in the fourth direction from the upper hub;
   a first upper interface, made of polycrystalline silicon, located on a distal end of the first upper wing relative to the upper hub and extending in the first direction from the first upper wing; and
   a second upper interface, made of polycrystalline silicon, located on a distal end of the second upper wing relative to the upper hub and extending in the first direction from the second upper wing.

3. The method of claim 2, wherein the upper hub is made of monocrystalline silicon having a shared crystal matrix with the upper ridge.

4. The method of claim 2, wherein the upper hub is doped at a lower concentration than the first upper wing and the second upper wing.

5. The method of claim 1, wherein the base component includes:

the substrate;

the first layer of the insulator, formed on the substrate;

a Silicon-On-Insulator (SOI) layer, formed on the first layer of the insulator and doped to exhibit a first type of conductivity, wherein patterning the base component imparts the lower waveguide in the SOI layer;

a spacing layer, formed on the SOI layer; and a second silicon layer, formed on the spacing layer and doped to exhibit a different type of conductivity than the SOI layer, wherein patterning the base component imparts the upper ridge in the second silicon layer.

6. The method of claim 5, further comprising, prior to patterning the base component, applying a cap layer to the second silicon layer; and wherein patterning the base component further imparts a cap, made from the cap layer, extending upward from the upper ridge.

7. A method, comprising:

forming a lower waveguide from monocrystalline silicon doped to exhibit a first conductivity type, wherein the lower waveguide includes:
  a lower hub;
  a first lower wing that extends in a first direction from the lower hub;
  a second lower wing that extends in a second direction from the lower hub; and
  a lower ridge that extends upward from the lower hub, wherein the lower ridge is doped less than the first lower wing and the second lower wing;

depositing a gate oxide layer on an upper surface of the lower waveguide;

forming an upper waveguide, doped to exhibit a second conductivity type that is different from the first conductivity type, wherein the upper waveguide includes:
  an upper ridge, made of monocrystalline silicon, that is aligned with the lower ridge on a first axis and extends upward from the gate oxide layer to form a waveguide region with the lower ridge and the gate oxide layer;
  a first upper wing, made of polycrystalline silicon that is doped greater than the upper ridge, that extends in the first direction perpendicularly from the upper ridge;
  a second upper wing, made of polycrystalline silicon that is doped greater than the upper ridge, that extends in the second direction perpendicularly from the upper ridge; and
  an upper hub, made of polycrystalline silicon, that extends upward from the upper ridge, is aligned with the upper ridge on the first axis, and is aligned with the first upper wing and the second upper wing on a second axis perpendicular to the first axis.

8. The method of claim 7, wherein the upper waveguide further comprises a cap, made of Silicon Nitride, extending in the first direction from the upper hub.

* * * * *

UNITED STATES PATENT AND TRADEMARK OFFICE
CERTIFICATE OF CORRECTION

PATENT NO. : 11,906,824 B2
APPLICATION NO. : 18/177497
DATED : February 20, 2024
INVENTOR(S) : Xunyuan Zhang et al.

Page 1 of 1

It is certified that error appears in the above-identified patent and that said Letters Patent is hereby corrected as shown below:

In the Specification

In Column 8, Line 7, delete "$L_{l1}$" and insert -- $L_{Ll1}$ --.

Signed and Sealed this
Twenty-first Day of January, 2025

Coke Morgan Stewart
*Acting Director of the United States Patent and Trademark Office*